United States Patent
Totsuka et al.

(10) Patent No.: US 10,594,971 B2
(45) Date of Patent: Mar. 17, 2020

(54) IMAGING DEVICE AND IMAGING SYSTEM PERFORMING MULTIPLE A/D CONVERSIONS OF A SINGULAR PIXEL SIGNAL

(71) Applicant: CANON KABUSHIKI KAISHA, Tokyo (JP)

(72) Inventors: Hirofumi Totsuka, Fujisawa (JP); Daisuke Yoshida, Ebina (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 61 days.

(21) Appl. No.: 15/977,653

(22) Filed: May 11, 2018

(65) Prior Publication Data
US 2018/0262706 A1 Sep. 13, 2018

Related U.S. Application Data

(63) Continuation of application No. 15/235,679, filed on Aug. 12, 2016, now Pat. No. 10,003,761.

(30) Foreign Application Priority Data

Sep. 10, 2015 (JP) .................. 2015-178255
Apr. 19, 2016 (JP) .................. 2016-083424

(51) Int. Cl.
*H04N 5/3745* (2011.01)
*H04N 5/378* (2011.01)

(52) U.S. Cl.
CPC ......... *H04N 5/37455* (2013.01); *H04N 5/378* (2013.01); *H04N 5/37452* (2013.01)

(58) Field of Classification Search
CPC . H04N 5/37455; H04N 5/378; H04N 5/37452
See application file for complete search history.

(56) References Cited

U.S. PATENT DOCUMENTS

| 7,633,540 B2 | 12/2009 | Totsuka |
| 7,705,897 B2 | 4/2010 | Muramatsu |
| 7,786,921 B2 | 8/2010 | Nitta |
| 7,928,889 B2 | 4/2011 | Sakurai |

(Continued)

FOREIGN PATENT DOCUMENTS

| CN | 1770831 | 5/2006 |
| CN | 101931411 | 12/2010 |

(Continued)

OTHER PUBLICATIONS

Chinese Office Action dated Jun. 12, 2019 during prosecution of related Chinese application No. 201610806636.4. (Whole English-language translation included.).

*Primary Examiner* — Albert H Cutler
(74) *Attorney, Agent, or Firm* — Venable LLP

(57) ABSTRACT

Provided is an imaging device that performs multiple AD conversions including a first AD conversion and a second AD conversion for one pixel signal. A first memory has a bit width of N+1 bits (N is a natural number) and holds the least significant bit to the N+1th bit of a digital value obtained by the first AD conversion, and second memory has a bit width of M bits (M is a natural number) greater than N+1 bits and holds the least significant bit to the Mth bit of a digital value obtained by the second AD conversion.

26 Claims, 14 Drawing Sheets

(56) References Cited

U.S. PATENT DOCUMENTS

| | | |
|---|---|---|
| 7,990,440 B2 | 8/2011 | Kobayashi et al. |
| 8,084,729 B2 | 12/2011 | Kato et al. |
| 8,154,639 B2 | 4/2012 | Kato et al. |
| 8,189,081 B2 | 5/2012 | Totsuka |
| 8,309,898 B2 | 11/2012 | Kato et al. |
| 8,400,546 B2 | 3/2013 | Itano et al. |
| 8,411,185 B2 | 4/2013 | Totsuka |
| 8,421,891 B2 | 4/2013 | Morikawa |
| 8,553,118 B2 | 10/2013 | Saito et al. |
| 8,605,182 B2 | 12/2013 | Totsuka et al. |
| 8,698,062 B2 | 4/2014 | Yoshida |
| 8,848,079 B2 | 9/2014 | Itano et al. |
| 8,937,672 B2 | 1/2015 | Totsuka et al. |
| 8,976,278 B2 | 3/2015 | Yao |
| 9,013,765 B2 | 4/2015 | Totsuka |
| 9,159,750 B2 | 10/2015 | Ikeda et al. |
| 9,282,263 B2 | 3/2016 | Totsuka |
| 9,332,202 B2 | 5/2016 | Totsuka |
| 9,337,222 B2 | 5/2016 | Saito et al. |
| 9,350,958 B2 | 5/2016 | Totsuka et al. |
| 9,407,839 B2 | 8/2016 | Yoshida |
| 9,438,841 B2 | 9/2016 | Yamazaki |
| 9,491,390 B2 | 11/2016 | Johansson |
| 9,973,720 B2 | 5/2018 | Shioya |
| 2007/0046795 A1 | 3/2007 | Yamashita |
| 2009/0201709 A1 | 8/2009 | Inoue |
| 2012/0098990 A1 | 4/2012 | Jung |
| 2014/0016006 A1 | 1/2014 | Tashiro |
| 2015/0036005 A1* | 2/2015 | Kelly ............... H04N 5/2355 348/208.1 |
| 2015/0264283 A1 | 9/2015 | Kobayashi et al. |
| 2015/0281614 A1 | 10/2015 | Yoshida et al. |
| 2015/0281616 A1 | 10/2015 | Muto et al. |
| 2015/0319380 A1 | 11/2015 | Yoshida |
| 2015/0350585 A1 | 12/2015 | Kim |
| 2015/0365616 A1 | 12/2015 | Yoshida |
| 2016/0295150 A1 | 10/2016 | Hwang |
| 2016/0301886 A1 | 10/2016 | Muto et al. |
| 2017/0019621 A1 | 1/2017 | Totsuka |
| 2017/0026053 A1 | 1/2017 | Lee |
| 2017/0118427 A1 | 4/2017 | Totsuka et al. |
| 2017/0208285 A1* | 7/2017 | Yu ..................... H04N 5/378 |

FOREIGN PATENT DOCUMENTS

| | | |
|---|---|---|
| CN | 102595066 | 7/2012 |
| CN | 103369268 | 10/2013 |
| CN | 104142510 | 11/2014 |
| CN | 104469202 | 3/2015 |
| JP | 2010-103913 | 5/2010 |
| JP | 2013-93837 | 5/2013 |
| JP | 2013-207433 | 10/2013 |

* cited by examiner

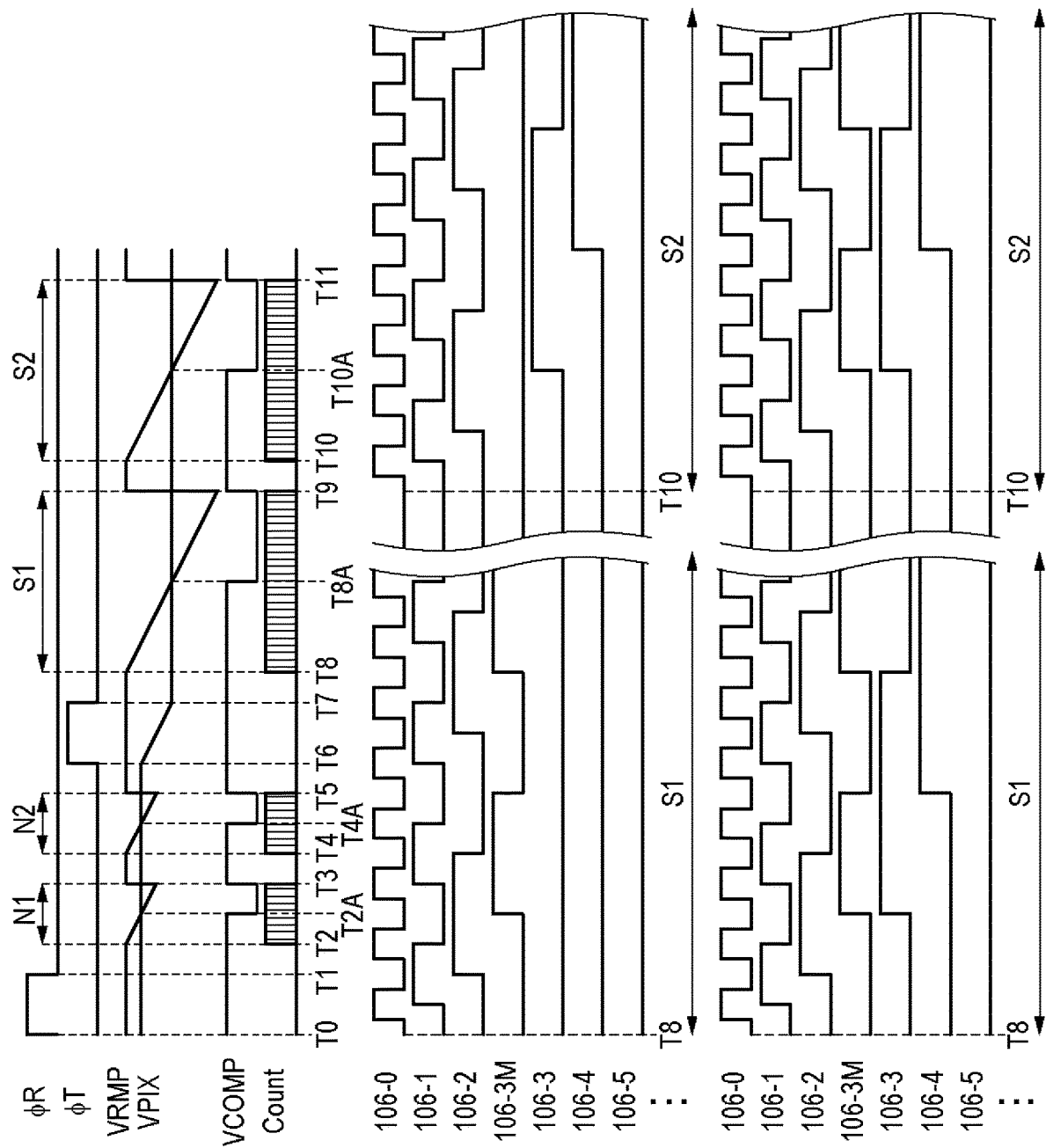

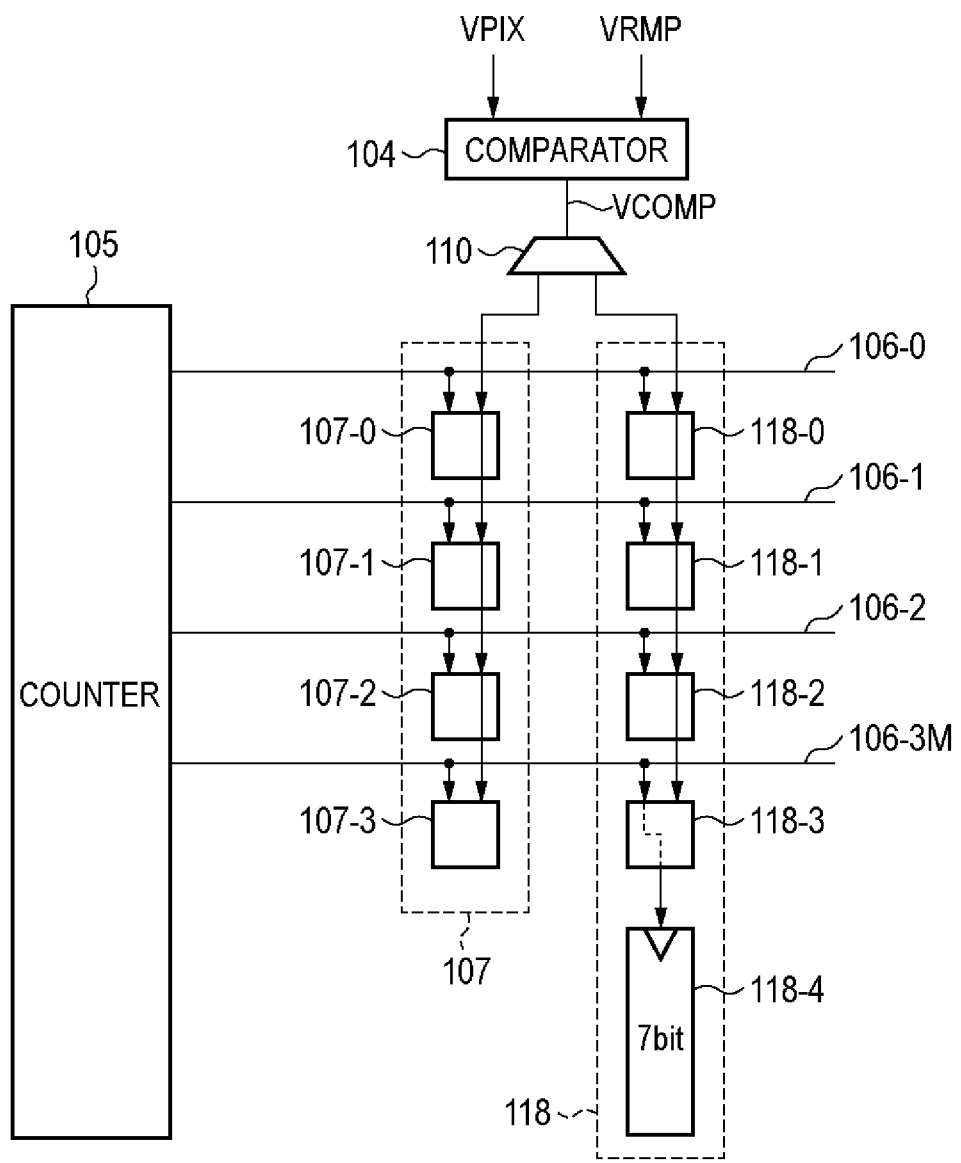

IMAGING DEVICE AND IMAGING SYSTEM PERFORMING MULTIPLE A/D CONVERSIONS OF A SINGULAR PIXEL SIGNAL

This application is a continuation of application Ser. No. 15/235,679, filed Aug. 12, 2016.

BACKGROUND OF THE INVENTION

Field of the Invention

The present invention relates to an imaging device and an imaging system.

Description of the Related Art

One type of circuit configurations of a complementary metal oxide semiconductor (CMOS) image sensor has analog-to-digital (AD) conversion circuits provided correspondingly to columns of a plurality of pixels. In relation to such a CMOS image sensor, Japanese Patent Application Laid-open No. 2010-103913 discloses that a thermal noise caused by operation of an imaging device can be reduced by performing, or applying, AD conversions for signals from pixels for multiple times and adding digital values obtained by the AD conversions.

Further, Japanese Patent Application. Laid-open No. 2013-93837 discloses an imaging device in which a counter outputs a count value to a storage on each column via a buffer. This storage on each column of the imaging device holds a count value at a timing when the magnitude relationship between the potential of a pixel signal and the potential of a ramp signal is inverted.

In the configuration of Japanese Patent Application Laid-open No. 2013-93837, however, multiple AD conversions for input pixel signals requires additional storages for holding the AD conversion results for respective times, which may result in an increase of the number of elements.

SUMMARY OF THE INVENTION

The present invention has been made in view of the objects described above, and intends to reduce the number of elements in an imaging device that has AD conversion circuits on respective columns of a plurality of pixels and performs multiple AD conversions to input pixel signals.

An imaging device according to one aspect of the present invention includes: a plurality of pixels arranged to form a plurality of columns and each configured to output a pixel signal by a photoelectric conversion in accordance with an incident light; AD conversion circuits provided correspondingly to the plurality of columns and each configured to perform AD conversions for the pixel signal; and first memories provided correspondingly to the plurality of columns and second memories each provided correspondingly to the plurality of columns. Each of the AD conversion circuits performs, or applies, multiple AD conversions including a first AD conversion and a second AD conversion for the same pixel signal which is a singular one of the pixel signal. Each of the first memories has a bit width of N+1 bits (N is a natural number) and holds the least significant bit to an N+1th bit of a first digital value obtained by the first AD conversion. Each of the second memories has a bit width of M bits (M is a natural number) greater than N+1 bits, and holds the least significant bit to an Mth bit of a second digital value obtained by the second AD conversion.

An imaging system according to another aspect of the present invention includes an imaging device including a plurality of pixels arranged to form a plurality of columns and each configured to output a pixel signal by a photoelectric conversion in accordance with an incident light; AD conversion circuits provided correspondingly to the plurality of columns and each configured to perform AD conversions for the pixel signal; and first memories provided correspondingly to the plurality of columns and second memories provided correspondingly to the plurality of columns. Each of the AD conversion circuits performs multiple AD conversions including a first AD conversion and a second AD conversion to the same pixel signal which is a singular one of the pixel signal. Each of the first memories has a bit width of N+1 bits (N is a natural number) and holds the least significant bit to an N+1th bit of a first digital value obtained by the first AD conversion. Each of the second memories has a bit width of M bits (M is a natural number) greater than N+1 bits, and holds the least significant bit to an Mth bit of a second digital value obtained by the second AD conversion. The imaging system further includes a signal processing unit configured to process a signal output from the imaging device.

An imaging device according to another aspect of the present invention includes: a plurality of pixels arranged to form a plurality of columns and each configured to output a pixel signal by a photoelectric conversion in accordance with an incident light; comparators provided correspondingly to the plurality of columns and each configured to determine a magnitude relationship in comparison between the pixel signal and a reference signal changing with time and output a control signal in response to an inversion of the magnitude relationship; a counter configured to output a count value indicating elapsed time after the reference signal starts changing; and first memories provided correspondingly to the plurality of columns and each configured to hold the count value at a point of time when the control signal is output and second memories provided correspondingly to the plurality of columns and each configured to hold the count value at a point of time when the control signal is output. Each of the comparators performs multiple comparisons including a first comparison and a second comparison on the same pixel signal which is a singular one of the pixel signal. Each of the first memories has a bit width of N+1 bits (N is a natural number) and holds the least significant bit to an N+1th bit of a first count value obtained by the first comparison. Each of the second memories has a bit width of M bits (M is a natural number) greater than N+1 bits, and holds the least significant bit to an Mth bit of a second count value obtained by the second comparison.

An imaging system according to another aspect of the present invention includes an imaging device including a plurality of pixels arranged to form a plurality of columns and each configured to output a pixel signal by a photoelectric conversion in accordance with an incident light; comparators provided correspondingly to the plurality of columns and each configured to determine a magnitude relationship in comparison between the pixel signal and a reference signal changing with time and output a control signal in response an inversion of to the magnitude relationship; a counter configured to output a count value indicating elapsed time after the reference signal starts changing; and first memories provided correspondingly to the plurality of columns and each configured to hold the count value at a point of time when the control signal is output and second memories provided correspondingly to the plurality of columns and each configured to hold the count value at a point of time when the control signal is output. Each of the comparators performs multiple comparisons including a first comparison and a second comparison on the same pixel signal which is a singular one of the pixel signal. Each of the first memories has a bit width of N+1 bits (N is a natural number) and holds the least significant bit to an N+1th bit of a first count value obtained by the first comparison. Each of the second memories has a bit width of M bits (M is a natural number) greater than N+1 bits, and holds the least significant bit to an Mth bit of a second count value obtained by the second comparison. The imaging system further includes a signal processing unit configured to process a signal output from the imaging device.

Further features of the present invention will become apparent from the following description of exemplary embodiments with reference to the attached drawings.

BRIEF DESCRIPTION OF THE DRAWINGS

FIG. 3A is a timing diagram illustrating operation of the imaging device according to the first embodiment.

FIG. 3B is a timing diagram illustrating count, signals.

FIG. 30 is a timing diagram illustrating a modified example of count signals.

FIG. 5 is a block diagram illustrating in greater detail a configuration of a first memory set and a second memory set according to a second embodiment.

DESCRIPTION OF THE EMBODIMENTS

Preferred embodiments of the present invention will now be described in detail in accordance with the accompanying drawings.

First Embodiment

Figure 1A:
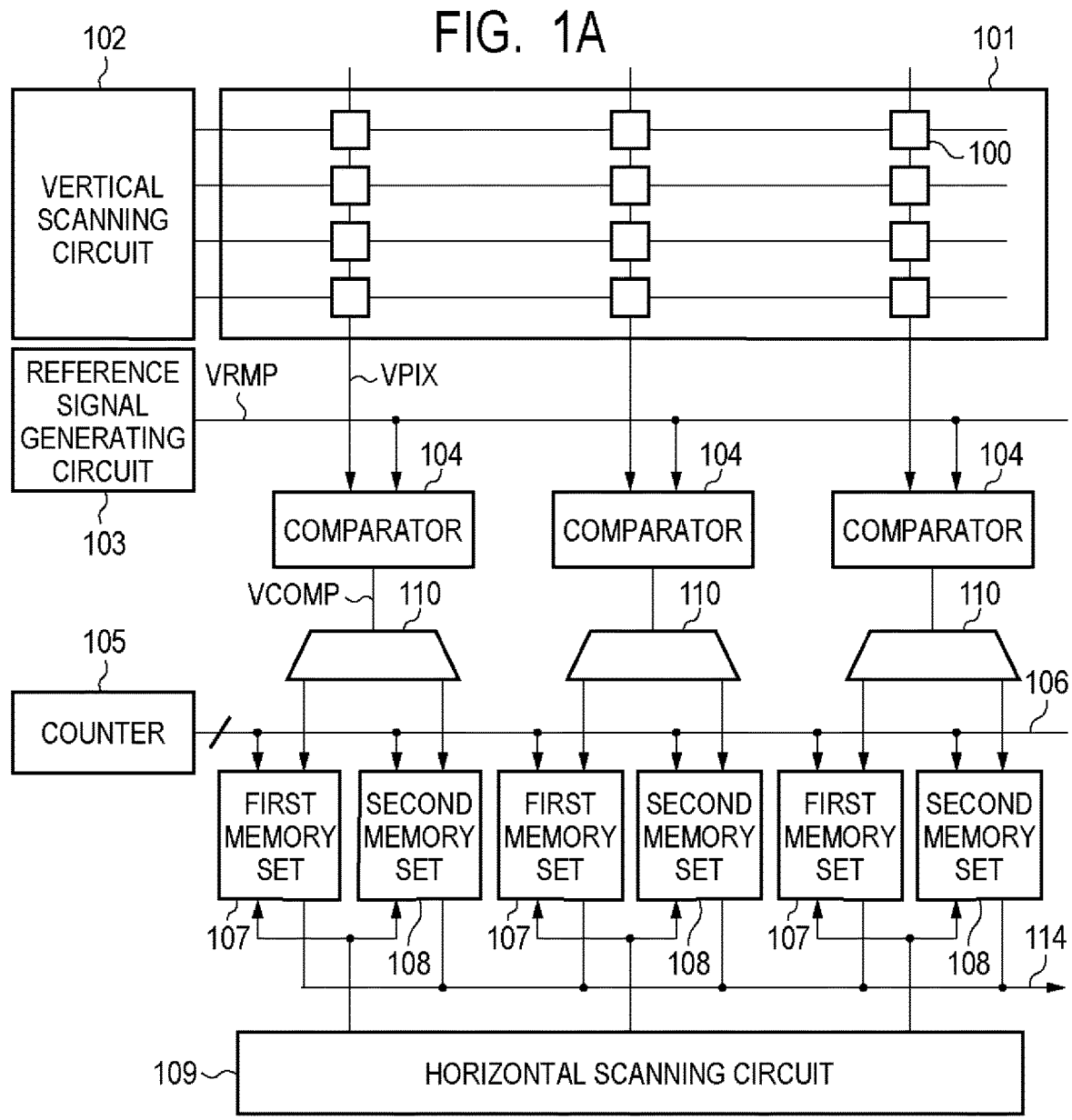
FIG. 1A is a block diagram illustrating configuration of an imaging device according to a first embodiment.
Figure 1B:
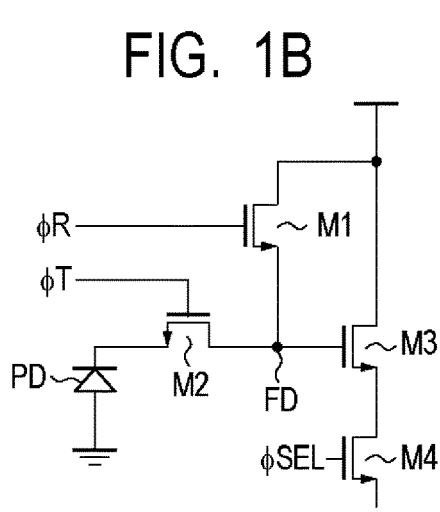
FIG. 1B is a circuit diagram illustrating a configuration of a pixel.

FIG. 1A and FIG. 1B illustrate an imaging device of the first embodiment. FIG. 1A is a block diagram illustrating a configuration of the imaging device, and FIG. 1B is a circuit diagram illustrating a configuration of a pixel.

The imaging device includes a pixel array 101, a vertical scanning circuit 102, a reference signal generating circuit 103, a plurality of comparators 104, a counter 105, a plurality of first memory sets 107, a plurality of second memory sets 108, a horizontal scanning circuit 109, and a plurality of selection circuits 110. The pixel array 101 includes a plurality of pixels 100 arranged in a matrix including a plurality of rows and a plurality of columns. The comparators 104, the first memory sets 107, the second memory sets 108, and the selection circuits 110 are provided corresponding to columns of the pixel array 101.

Pixel 100 has a photoelectric conversion unit PD, reset transistor M1, transfer transistor M2, an amplification transistor M3, and a selection transistor M4. The photoelectric conversion unit PD generates charges by a photoelectric conversion in accordance with an incident light. The photoelectric conversion unit PD is formed of a photodiode, for example. The reset transistor M1, the transfer transistor M2, and the selection transistor M4 are controlled by control signals φR, φT, and φSEL supplied from the vertical scanning circuit 102, respectively. The photoelectric conversion unit PD is connected to the source of the transfer transistor M2, and the drain of the transfer transistor M2 is connected to a floating diffusion FD that is the gate node of the amplification transistor M3. Turning on of the transfer transistor M2 causes charges generated by the photoelectric conversion unit PD to be transferred to the floating diffusion FD.

The source of the reset transistor M1 is connected to the floating diffusion FD, and the drain of the reset transistor M1 is connected to a power supply line having a power supply voltage. Turning on of the reset transistor M1 causes the voltage of the floating diffusion FD to be reset. Such a configuration allows the pixel 100 to output a reset level signal corresponding to a state where the voltage of the floating diffusion FD has been reset and an optical signal corresponding to a state where charges have been transferred to the floating diffusion FD after the resetting.

The drain of the amplification transistor M3 is connected to the power supply line, and the source of the amplification transistor M3 is connected to the drain of the selection transistor M4. The source of the selection transistor M4 is connected to an output line of the pixel 100. The amplification transistor M3 can operate as source follower by being connected to a current load (not illustrated) when the selection transistor M4 is turned on. At this time, the amplification transistor M3 outputs, to the output line of the pixel 100, a pixel signal VPIX in accordance with charges transferred to the floating diffusion FD. This output line is provided commonly on each column of the pixel array 101 and connected to the comparator 104.

The vertical scanning circuit 102 outputs the control signals φR, φT, and φSEL described above to the pixel 100 on each row of the pixel array 101, and controls a selection and readout operation of a predetermined row of the pixel array 101. A pixel signal VPIX read out from the pixel 100 and a reference signal VRMP generated by the reference signal generating circuit 103 are input to the comparator 104, and the magnitudes of these signals are compared to determine the magnitude relationship thereof. The comparator 104 outputs a control signal VCOMP representing a comparison result to the selection circuit 110. In response to an inversion of the magnitude relationship between the pixel signal VPIX and the reference signal VRMP, the polarity of the control signal VCOMP is inverted at the same timing. The reference signal VRMP is a signal whose voltage changes in accordance with time. Although the reference signal VRMP is a ramp signal whose voltage changes linearly with respect to time in the present embodiment, the reference signal VRMP is not limited thereto. For example, the reference signal VRMP may be a signal whose voltage changes in stepwise with respect to time. The selection circuit 110 selects either one of the first memory set 107 or the second memory set 108 as a memory set to which the control signal VCOMP is output.

The counter 105 outputs a count signal set 106 including, for example, an 11-bit Gray code signal via a plurality of signal lines. One of the plurality of signal lines to which the count signal set 106 is output from the counter 105 is connected commonly to the first memory set 107 and the second memory set 108 on corresponding column. The value (count value) indicated by the count signal set 106 corresponds to elapsed time after the reference signal VRMP starts changing. The first memory set 107 and the second memory set 108 hold count values as digital values that is an AD conversion result when the polarity of the control signal VCOMP is inverted. The digital values held in the first memory set 107 and the second memory set 108 are sequentially output to a post-stage circuit of the imaging device via an output line 114 at a timing when a control signal for a scan is input from the horizontal scanning circuit 109. In the present embodiment, two memory sets, that is, the first memory set 107 and the second memory set 108 are provided to the imaging device as memory sets for holding AD conversion results. Therefore, the imaging device can perform AD conversions twice and hold results of two AD conversions. While a specific process will be described later, the present embodiment can add these results of two AD conversions to reduce noise in an output signal.

Figure 2A:
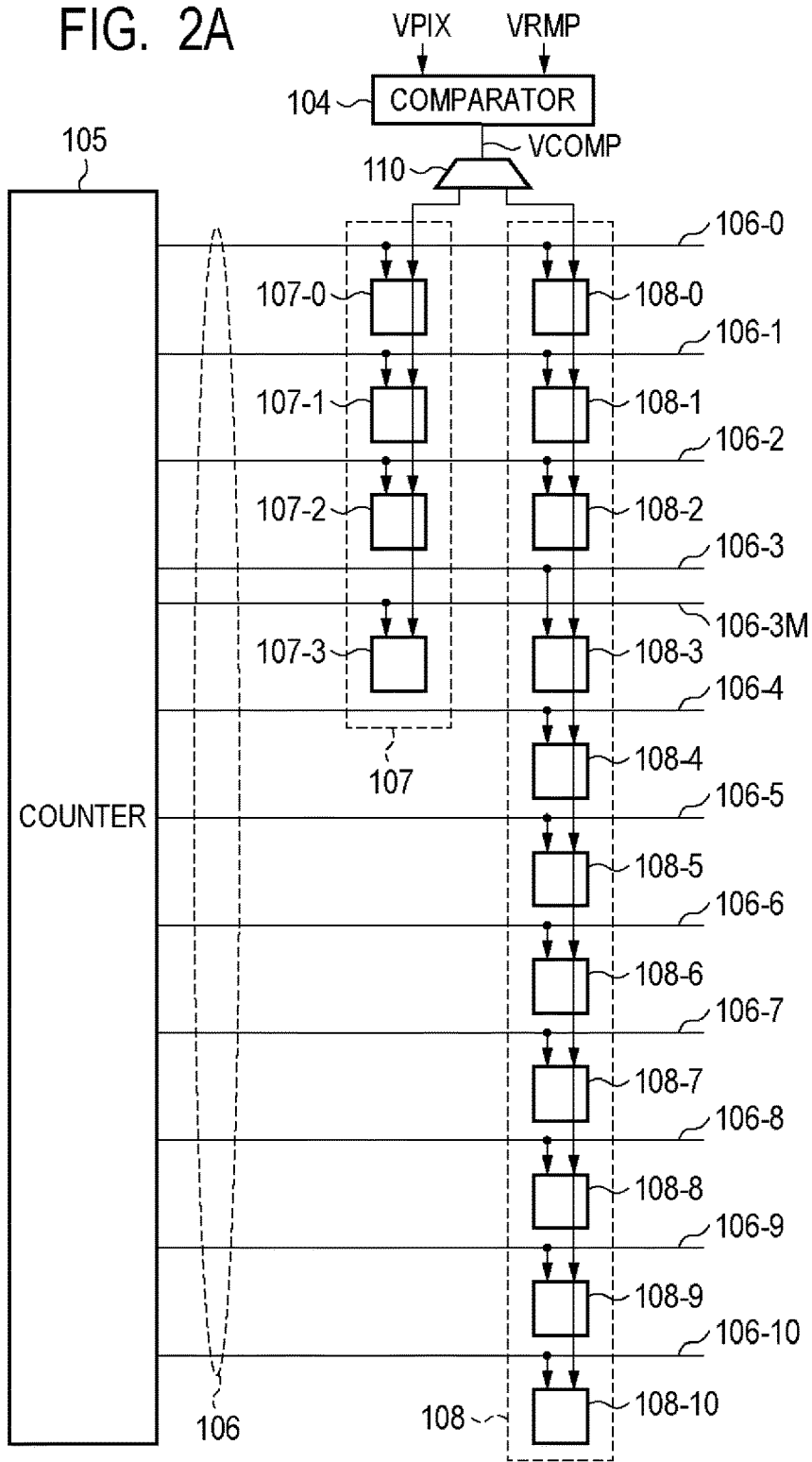
FIG. 2A is a block diagram illustrating in greater detail a configuration of a first memory set and a second memory set according to the first embodiment.
Figure 2B:
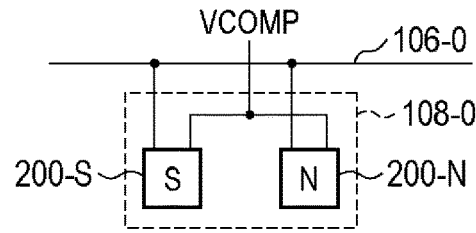
FIG. 2B block diagram illustrating in greater detail of a configuration of memories.

FIG. 2A and FIG. 2B are diagrams illustrating the configuration of a column circuit corresponding to one column of the pixel array 101 for illustrating in greater detail the configuration of the first memory set 107 and the second memory set 108 of the first embodiment. FIG. 2A is a block diagram illustrating in greater detail the configuration of the first memory set and the second memory set according to the first embodiment, and FIG. 2B is a block diagram illustrating in greater detail the configuration of memories included in the first memory set and the second memory set.

The counter 105 outputs the count signal set 106 containing 12 count signals via 12 signal lines. Respective count signals transmitted on respective signal lines are denoted as 106-0 to 106-10 and 106-3M. The count signals 106-0 to 106-10 form an 11-bit Gray code signal in which the count signal 106-0 represents the least significant bit and the count signal 106-10 is the most significant bit. Further, the count signals 106-0, 106-1, 106-2, and 106-3M form a four-bit Gray code signal in which the count signal 106-0 represents the least significant bit and the count signal 106-3M represents the most significant hit.

The first memory set 107 includes memories 107-0 to 107-3 for four bits. The count signals 106-0, 106-1, 106-2, and 106-3 are input to the memories 107-0 to 107-3, respectively. The second memory set 108 includes memories 108-0 to 108-10 for 11 bits. The count signals 106-0 to 106-10 are input to the memories 108-0 to 108-10, respectively.

FIG. 2B illustrates an example configuration of the memories 107-0 to 107-3 and 108-0 to 108-10. While the configuration of the memory 108-0 only will be described as a representative of these memories, other memories can have the same configuration. The memory 108-0 of the present embodiment is configured to be able to hold two data in order to perform a digital correlated double sampling (CDS) process in an image signal processing unit; provided inside the imaging device or provided in the post-stage of the imaging device. The memory 108-0 has an N latch 200-N that holds an AD conversion result of a reset level signal and an S latch 200-S that holds an AD conversion result of an optical signal. Here, the number of memories included in the first memory set 107, that is, the bit width of the first memory set 107 is defined as a value that is larger than the maximum value of a differential value of one AD conversion result to another when multiple AD conversions are performed for the same signal which is a singular one of the pixel signal. Note that this differential value is mainly due to a random noise component superimposed on the pixel signal VPIX and the reference signal VRMP and a random noise component generated by the comparator 104. Thereby, a plurality of bit values which may vary between results of two AD conversions can be held.

For example, when the absolute value of the differential value between results of the first AD conversion and the second AD conversion is less than or equal to $2^N-1$ [LSB], the bit width necessary for the first memory set 107 is N+1 bits. It is assumed in the present embodiment that N=3, that is, the absolute value of the differential value is less than or equal to 7 [LSB] resulting in that the bit width of the first memory set 107 has been set to four bits. This is because the bit width of the first memory set 107 will be at least four bits since the higher seven bits (=11 bits−4 bits) are the same value for results of all the AD conversions in the first AD conversion and the second AD conversion.

Next, operation of the imaging device of the present embodiment will be described by using timing diagrams of FIG. 3A, FIG. 3B, and FIG. 3C. FIG. 3A is a timing diagram illustrating operation of the entire imaging device according to the first embodiment. FIG. 3B is a timing diagram illustrating count signals. FIG. 3C is a timing diagram illustrating a modified example of count signals.

First, during a period from time T0 to time T1, the control signal φR becomes a high level and the reset transistor M1 is turned on. This causes the voltage of the floating diffusion FD to be reset to a predetermined voltage level. Then, during a period N1 from time T2 to time T3 and a period N2 from time T4 to time T5, two AD conversions are performed for the pixel signal VPIX in a reset level.

First, the first AD conversion during the period N1 will be described. During the period N1, the selection circuit 110 selects the first memory set 107 as a memory set to which the control signal VCOMP is output. At the time T2, the voltage of the reference signal VRMP output from the reference signal generating circuit 103 starts decreasing. At the same time, a count value indicated by the count signal set 106 output from the counter 105 starts increasing with time. At this time, since the voltage of the reference signal VRMP is larger than the voltage of the pixel signal VPIX in a reset level, the control signal VCOMP that is an output of the comparator 104 is in a high level.

Then, at time T2A when the voltage of the reference signal VRMP becomes smaller than the voltage of the pixel signal VPIX in a reset level, the magnitude relationship between the voltage of the reference signal VRMP and the voltage of the pixel signal VPIX in a reset level is inverted and the control signal VCOMP becomes a low level. The first memory set 107 holds, as a digital value in a reset level after subjected to the AD conversion, a count value indicated by the count signal set 106 at the point of the time T2A. The first memory set 107 includes four memories 107-0 to 107-3. In other words, since the first memory set 107 has a bit width of four bits, a digital value held in the first memory set 107 during the period N1 includes only lower four bits from the least significant bit to the fourth bit of a count value indicated by the count signal set 106.

The second AD conversion during the period N2 is then performed. During the period N2, the selection circuit 110 selects the second memory set 108 as a memory set to which the control signal VCOMP is output. The same AD conversion as described above is performed and, at time T4A, the second memory set 108 holds, as a digital value in a reset level after subjected to the AD conversion, a count value indicated by the count signal set 106 at the point of the time T4A. The second memory set 108 includes 11 memories 108-0 to 108-10. In other words, since the second memory set 108 has a bit width of 11 bits, a digital value held in the second memory set 108 during the period N2 includes the least significant bit to the 11th bit of a count value indicated by the count signal set 106. Note that digital values obtained by the AD conversions during the period N1 and the period N2 are held in the N latch 200-N in each memory. Further, the waveform of the reference signal VRMP used for the second AD conversion during the period N2 is assumed to be the same as the waveform of the reference signal VRMP used for the first AD conversion during the period N1.

The control signal φT then becomes a high level during a period from time T6 to time T7 and the transfer transistor M2 is turned on. Thereby, charges generated at the photoelectric conversion unit PD by an incident light are transferred to the floating diffusion FD. The voltage of the pixel signal VPIX decreases along with this charge transfer. At the time T7, the voltage of the pixel signal VPIX becomes a value in accordance with an optical signal by the charge transfer. Then, during the period S1 from time T8 to time T9 and the period S2 from time T10 to time T11, two AD conversions to the pixel signal VPIX of an optical signal level are performed.

Description of AD conversion operations during the periods S1 and S2 will be omitted, because they are the same as AD conversion operations during the periods N1 and N2 except that the digital value is held in the S latch 200-S of each memory.

Next, with reference to FIG. 3B, operation timings of the count signal set 106 will be described. FIG. 3B illustrates waveforms of the lower six bits of the count signals 106-0 to 106-5 and the count signal 106-3M of the count signal set 106 for the period S1 and the period S2.

At the time T8 that is the start time of the period S1, the count signals 106-0 to 106-2 and the 106-3M collectively represent "0000" in a Gray code value ("0" in the decimal system). After the time T8, the value is incremented with time elapse and, in response to reaching "1000" in a Gray code value ("15" in the decimal system), returns to "0000". Further, the count signals 106-3 to 106-10 are always in a low level (zero). In such a way, during the period S1, four-bit Gray code signal formed of the count signals 106-0 to 106-2 and 106-3M repeats counting from 0 to 15. Therefore, at time T8A when the level of the control signal VCOMP is inverted, any one of the count values from 0 to 15 is held in a Gray code in the S latch 200-S of the first memory set 107.

At the time T10 that is the start time of the period S2, the count signals 106-0 to 106-10 collectively represent "0 . . . 0000" in a Gray code value ("0" in the decimal system). After the time T10, the value indicated by the count signals 106-0 to 106-10 is incremented with time elapse. In such a way, during the period S2, counting with 11-bit Gray code formed of the count signals 106-0 to 106-10 is performed. Therefore, at time T10A when the level of the control signal VCOMP is inverted, a count value is held in an 11-bit Gray code in the S latch 200-S of the second memory set 108.

As discussed above, two AD conversions are performed during two periods, that is, the periods S1 and S2 in the present embodiment. A count value held during the period S2 is of 11 bits, that is, all the bits of the count signal set 106, and a count value held during the period S1 is the lower four bits of the count signal set 106. In this way, a noise that may be included in a result of an AD conversion can be reduced by using digital values obtained during the periods S1 and S2 to add or average the results of two AD conversions.

Note that in the count signals of FIG. 3B, the count signals output during the period S1 are different from the count signals output during the period S2. In particular, during the period S1, the count signals 106-3 to 106-10 that are not involved in any AD conversion operation are always set to a low level. This allows for reduced power consumption compared to the case where the levels of the count signals 106-3 to 106-10 are changed also during the period S1. As seen in a modified example of the count signals illustrated in FIG. 3C, however, the count signals during the periods S1 and S2 may operate in the same timing. That is, a count value output by the counter 105 at the first AD conversion may be the same as a count value output by the counter 105 at the second AD conversion. In this case, the operation of the counter 105 can be simplified.

Next, a processing method for obtaining a signal corresponding to an addition of the results of two AD conversions by using digital values held in the first memory set 107 and the second memory set 108 will be described with reference to FIG. 4. As described above, digital values held in respective memory sets are a digital value of the lower four bits held during the period S1 and a digital value of all the 11 bits held during the period S2. Therefore, since a simple addition of these values does not provide a desired value, a calculation process described below will be required. Note that a calculation process on these digital values is performed after a conversion from a Gray code to a binary code.

Now, the lower four bits held during the period S1 are denoted as S1(Lo). Further, all the bits held during the period S2 are denoted as S2(ALL), the lower four bits during the period S2 are denoted as S2(Lo), and the higher seven bits held during the period S2 are denoted as S2(Hi). Furthermore, although the higher seven bits are not held in a digital value held during the period S1 in the present embodiment, assuming all the 11 bits existing in this digital value, all the 11 bits are denoted as S1(ALL) and the higher seven bits are denoted as S1(Hi). However, since the higher bits of a digital value after multiple AD conversions have been performed are assumed to be the same values as described above, the following equation is established.

$$S1(Hi) = S2(Hi)$$

This process intends to use digital values held in the first memory set 107 and the second memory set 108 to calculate S1(ALL)+S2(ALL) that is a sum of the results of two AD conversions. Further, known values held in respective memory sets are S1(Lo) and S2(ALL). In this regard, an equation of S1(ALL)+S2(ALL) is modified as follows.

$$S1(ALL) + S2(ALL) = S1(Hi) + S1(Lo) + S2(Hi) + S2(Lo)$$
$$= 2 \times S2(Hi) + S2(Lo) + S1(Lo)$$
$$= 2 \times \{S2(Hi) + S2(Lo)\} + S1(Lo) - S2(Lo)$$
$$= 2 \times S2(ALL) + \text{diff}, \text{ where diff} = S1(Lo) - S2(Lo).$$

That is, the same value as S1(ALL)+S2(ALL) that is a sum of the results of two AD conversions can be calculated by adding a twofold S2(ALL), which is a value held in the second memory set 108, to the differential value diff (four-bit value).

Note that, since possible values of S1(Lo) and S2(Lo) are 0 to 15, a mere application of the differential value diff of the above equation may cause an error due to carrying or borrowing from a lower bit to a higher bit. Therefore, in some combination of S1(Lo) and S2(Lo), a digit operation of carrying or borrowing may be required to the differential value diff. Details of a digit operation will be determined depending on a value of S1(Lo)−S2(Lo) as follows.

Case 1: If −8<S1(Lo)−S2(Lo)<8, no digit operation is applied (diff can be defined as diff=S1(Lo)−S2(Lo)).

Case 2: If S1(Lo)−S2(Lo)≤−8, a digit operation is applied (diff can be defined as diff=S1(Lo)−S2(Lo)+$2^4$).

Case 3: If 8≤S1(Lo)−S2(Lo), a digit operation is applied (diff can be defined as diff=S1(Lo)−S2(Lo)−$2^4$).

Figure 4:
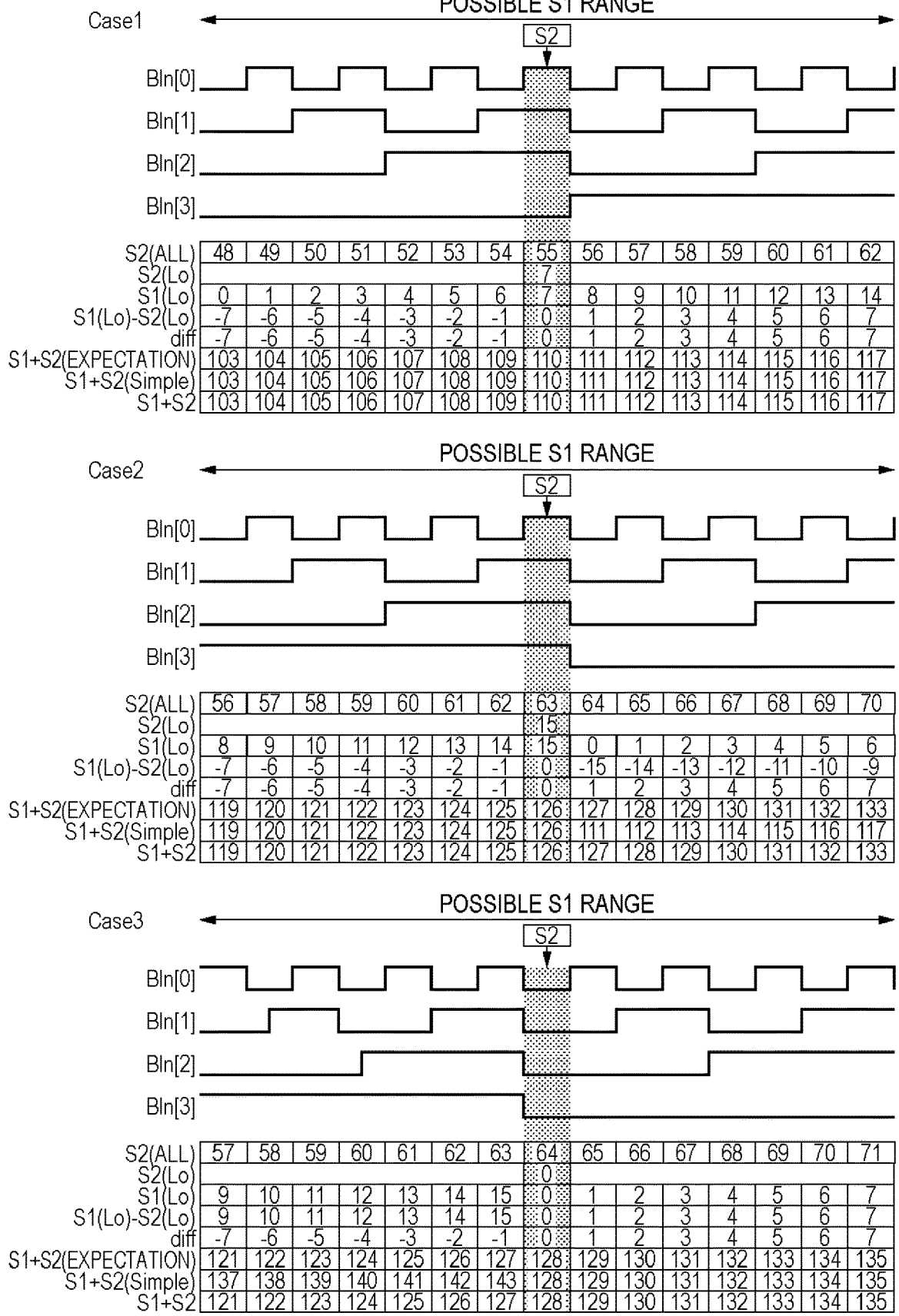
FIG. 4 is a diagram illustrating a processing method of digital values according to the first embodiment.

With reference to FIG. 4, details of a digit operation will be described below by using specific examples.

Case 1: Case of −8<S1(Lo)−S2(Lo)<8

Bin[0] to Bin[3] indicate the lower four bits of a waveform of respective bits after S1(Lo) or S2(Lo) have been converted into binary values. A row of S2(ALL) represents one example of possible values of Bin[0] to Bin[3].

In the following, a case where S2(ALL) is "55" (binary value "110111") will be described in this case. A row of S2(Lo) represents a value of the lower four bit (binary value "0111") when S2(ALL) is "55". When S2(ALL) is "55", a possible range of S1(ALL) is "55"±7 [LSB]. A row of S1(Lo) represents "0" to "14" (binary values "0000" to "1110") corresponding to the lower four bits of S1(ALL).

A row of S1(Lo)−S2(Lo) represents values of subtraction of S2(Lo) from S1(Lo), and a row of diff represents results after the digit operation. Note that, since no digit operation occurs in the present case, the row of diff has the same values as the row of S1(Lo)−S2(Lo).

A row of S1+S2(Expectation) represents expected values of an addition of S1(ALL)+S2(ALL) that is an AD conversion result in a possible range of S1(ALL) ("55"±7 [LSB]) when S2(ALL) is "55".

A row of S1+S2(Simple) represents the following equation that is a calculation value obtained if no above-described digit operation were applied.

2×S2(ALL)+S1(Lo)−S2(Lo)

A row of S1+S2 represents the following equation that is a calculation value after the digit operation.

2×S2(ALL)+diff

The digit operation is required to be performed so that this value becomes equal to the S1+S2(Expectation). In the present case, because −8<S1(Lo)−S2(Lo)<8, no difference occurs between S1+S2(Simple) and S1+S2(Expectation) in the possible range of the depicted S1. Thus, no digit operation is necessary in the present case.

Case 2: Case of S1(Lo)−S2(Lo)≤−8

This case illustrates a case where S2(ALL) is "63" (binary value "111111"), and S2(Lo) is "15" (binary value "1111").

For example, let us now consider a case where S1(ALL) is "64" (binary value "1000000") that is greater than S2(ALL) by "1". In this case, the value S1(Lo) actually held in the first memory set 107 is "0" (binary value "0000") and is defined by the following equation when no digit operation is performed.

S1(Lo)−S2(Lo)=0−15=−15

Therefore, the value of the row of S14-S2(Simple) that corresponds to a sum of the results of two AD conversions when no digit operation is performed is expressed by the following equation.

2×S2(ALL)+S1(Lo)−S2(Lo)=63×2−15=111

This result is different from "127" that is the S1+S2 (Expectation). The reason for this is as follows. The lower four bits S2(Lo) of the S2(ALL) value "63" is "15" (binary value "1111"). Here, S1(Lo), which is a value of the least significant bits of S1(ALL) that is greater by "1" than S2(ALL) "63", is not "16" next to "15" but "0". This is because the bit width of the least significant bits is only four bits. Therefore, the S1+S2(Simple) without a digit operation is shifted by "16" from the S1+S2(Expectation).

It is therefore necessary to define the diff by the following equation as a digit carry operation for correcting this value shift of "16".

diff=S1(Lo)−S2(Lo)+$2^4$

When this diff is used to calculate S1(ALL)+S2(ALL), the value of S1(ALL)+S2(ALL) after a carry operation has been performed is expressed by the following equation.

2×S2(ALL)+diff=2×63−15+16=127

This provides a result equal to the S1+S2(Expectation). While the example described above is for the case where S1(Lo) is "0", similar operations will be necessary for the cases where S1(Lo) is "1" to "6". Further, no digit operation described above is performed for the cases where S1(Lo) is "8" to "15".

Case 3: Case of 8≤S1(Lo)−S2(Lo)

This case illustrates a case where S2(ALL) is "64" (binary value "1000000"), and S2(Lo) is "0" (binary value "0000").

For example, let us now consider a case where S1(ALL) is "63" (binary value "111111") that is smaller than S2(ALL) by "1". In this case, the value S1(Lo) actually held in the first memory set 107 is "15" (binary value "1111") and the following equation is obtained when no digit operation is applied.

S1(Lo)−S2(Lo)=15−0=15

Therefore, the value of the row of S1+S2(Simple), which corresponds to a sum of the results of two AD conversions when no digit operation is applied, is expressed by the following equation.

2×S2(ALL)+S1(Lo)−S2(Lo)=64×2+15=143

This result is different from "127" that is the S1+S2 (Expectation). In this case, contrary to Case 2, it is necessary to define the diff by the following equation as a digit borrow operation.

diff=S1(Lo)−S2(Lo)−$2^4$

When this diff is used to calculate S1(ALL)+S2(ALL), the value of S1(ALL)+S2(ALL) after a borrow operation has been performed is expressed by the following equation.

$$2 \times S2(ALL) + \text{diff} = 2 \times 64 + 15 - 16 = 127$$

This provides a result equal to the S1+S2(Expectation). While the example described above is for the case where S1(Lo) is "15", similar operations will be necessary for the cases where S1(Lo) is "9" to "14". Further, no digit operation described above is performed for the cases where S1(Lo) is "0" to "7".

Although the above description of digit operations is for AD conversion results of an optical signal, the similar operation can be applied to AD conversions results of a pixel reset level. After the end of a digit operation, image data in which a noise included in a reset level is removed can be obtained by performing a digital CDS process. Note that the digit operation method described above may be performed inside the imaging device as long as it is performed in the post-stage of each memory set or may be performed in an image signal processing unit or the like in the post-stage of the imaging device.

As described above, according to the present embodiment, noise can be reduced by performing, or applying, multiple AD conversions for a pixel signal output from the same pixel and adding the obtained AD conversion results. In this addition, the bit width of the first memory set 107 is set smaller than the number of all the bits of a signal depending on expected noise. This allows for a reduced number of memories within the first memory set 107 compared to the case where the number of memories within the first memory set 107 were set to the same number as the number of all the bits of the signal. For example, eleven memories are reduced to four memories in the example described above. Therefore, the number of elements in the imaging device can be reduced.

Note that, although a count signal output from the counter 105 is in the form of a Gray code in the above description, it may be in other form than a Gray code. For example, a binary code with typical binary digits may be employed. However, since a Gray code has only one bit that is inverted at an increment of a count value and this can reduce the effect of a timing difference between an increment of the count value and a change of a comparator output, it is more preferable to apply a Gray code to a count signal.

Note that, although the bit width of the first memory set 107 is four bits, the bit width of the second memory set 108 is 11 bits, and the count value represented by the count signal set 106 is also 11 bits in the above description, the embodiment is not limited thereto. That is, these number of bits can be any value without departing from the spirit of the present invention. In more details, the following generalization is possible. It is assumed that, when the absolute value of a differential value between results of the first AD conversion and the second AD conversion is less than or equal to $2^N - 1$ [LSB] (N is a natural number), the bit width of the first memory set 107 is N+1 bits. It is then assumed that the bit width of the second memory set 108 and the number of bits of a count value represented by the count signal set 106 are M bits (M is a natural number) that is greater than N+1 bits. In this case, the first memory set 107 holds the least significant bit to the N+1th bit of the count signal set 106, and the second memory set 108 holds the least significant bit to the Mth bit of the count signal set 106.

In this case, the digit operation described above can be generalized by using N as follows.

Case 1: If $-(2^N-1) \leq S1(Lo) - S2(Lo) \leq (2^N-1)$, no digit operation is applied.

Case 2: If $S1(Lo) - S2(Lo) < -(2^N-1)$, a digit operation is applied (the diff is defined as $\text{diff} = S1(Lo) - S2(Lo) + 2^{N+1}$).

Case 3: If $(2^N-1) < S1(Lo) - S2(Lo)$, a digit operation is applied (the diff is defined as $\text{diff} = S1(Lo) - S2(Lo) - 2^{N+1}$).

Although the imaging device is configured to perform two AD conversions and hold the AD conversion results in two memory sets in the above description, the times of AD conversions and the number of memory sets are each not limited to two. For example, it may be configured to perform three or more AD conversions and hold the AD conversion results in three or more memory sets.

Although digital values obtained by multiple AD conversions are merely added in the above description, this addition may not be a mere addition. For example, the adding operation described above may be replaced with an averaging operation by dividing an added value by the number of added signals.

Second Embodiment

FIG. 5 is a diagram illustrating the configuration of the first memory set 107 and the second memory set 118 of the second embodiment. Note that, in the present embodiment, since the configuration of the imaging device is the same as that in the first embodiment illustrated in FIG. 1A and FIG. 1E, description thereof will be omitted.

The configuration of the first memory set 107 is the same as that in the first embodiment. The configuration of the second memory set 118 is different from the second memory set 108 of the first embodiment in that the memories 108-4 to 108-10 are replaced with a ripple Counter 118-4 having a 7-bit width. That is, the second memory set 118 includes memories 118-0 to 118-3 for the lower four bits and the ripple counter 118-4. The count signals 106-0, 106-1, 106-2, and 106-3M that are the same as those input to the first memory set 107 are input to the memories 118-0 to 118-3 from the counter 105. Furthermore, the count signal 106-3M is input to the ripple counter 118-4 via the memory 118-3. The ripple counter 118-4 counts a falling edge of the count signal 106-3M. That is, at the time when the count signal 106-3M transits from a high level to a low level, the value held in the ripple counter 118-4 increases or decreases. Here, a setting scheme of the bit width of the first memory set 107 is the same as that described in the first embodiment, description thereof will be omitted.

Figure 6A:
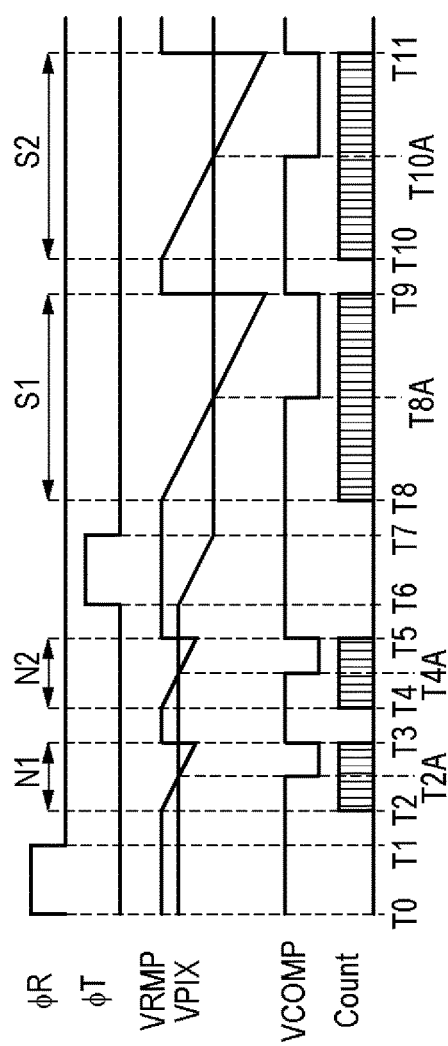
FIG. 6A is a timing diagram illustrating operation of the entire imaging device according to the second embodiment.
Figure 6B:
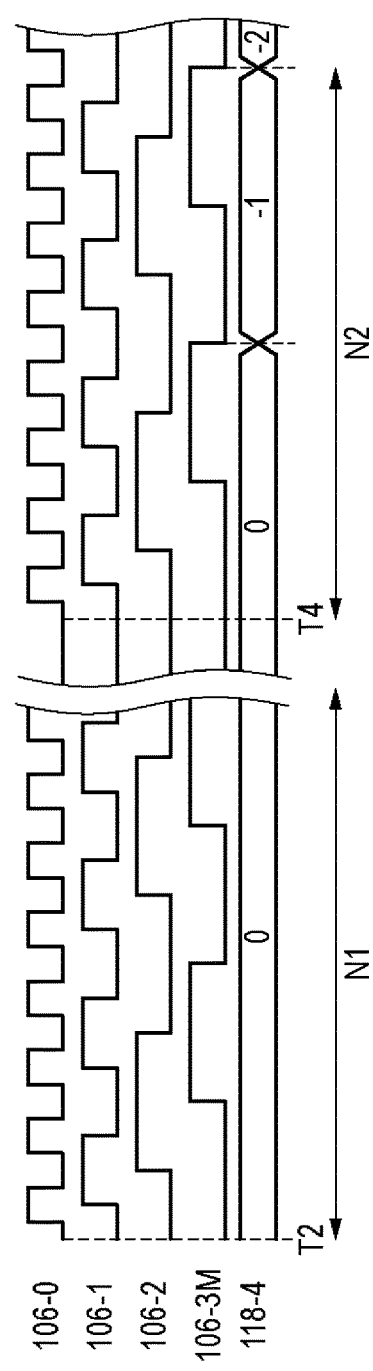
FIG. 6B is a timing diagram illustrating count signals during periods N1 and N2.
Figure 6C:
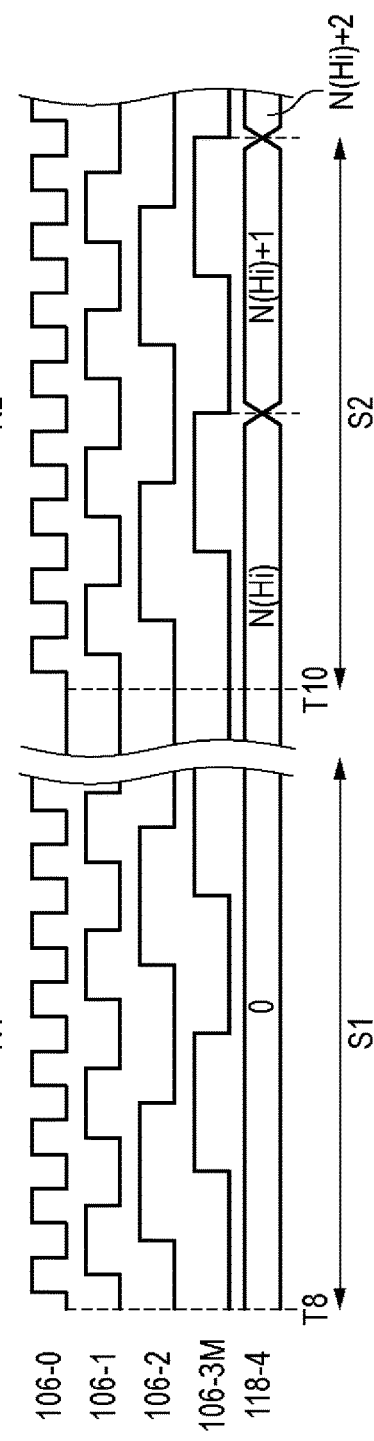
FIG. 6C is a timing diagram illustrating count signals during periods S1 and S2.

Next, operation of the imaging device of the present embodiment will be described by using timing diagrams of FIG. 6A, FIG. 6B, and FIG. 6C. FIG. 6A is a timing diagram illustrating operation of the entire imaging device according to the second embodiment. FIG. 6B is a timing diagram illustrating count signals during the periods N1 and N2. FIG. 6C is a timing diagram illustrating count signals during the periods S1 and S2. The operating timings of the control signals φR and φT, the reference signal VRMP, the pixel signal. VPIX, and the control signal VCOMP illustrated in FIG. 6A are the same as those in the first embodiment, and the feature that AD conversions are performed during the periods N1, N2, S1, and S2 is also the same as that in the first embodiment. Accordingly, detailed description thereof will be omitted.

Operation of the ripple counter 118-4 during the periods N2 and S2 that makes a difference of the present embodiment from the first embodiment will be described below. As illustrated in FIG. 6B, the ripple counter 118-4 counts down in response to a falling edge of the count signal 106-3M during the period N2. In other words, the count value held in the ripple counter 118-4 is decremented by one when the count value of the lower bits returns to 0 from 15. Then, at the time T4A, the polarity of the control signal VCOMP is inverted. At this time, the values of the count signals 106-0 to 106-2 and 106-3M at this point are held in respective N latches 200-N within the memories 118-0 to 118-3 of the second memory set 118. Furthermore, a change in the counter signal 106-3M supplied to the ripple counter 118-4 is controlled to be stopped at this time, and the ripple counter 118-4 also holds a count value N(Hi) at the point of the time T4A until an AD conversion during the period S2 is started.

As illustrated in FIG. 6C, during the period S2 subsequent to the above operation, the ripple counter 118-4 counts up in response to a falling edge of the count signal 106-3M. In this operation, the initial value of the count value of the ripple counter 118-4 is a count value N(Hi) at the point of the time T4A. Then, at time T10A, the polarity of the control signal VCOMP is inverted. At this time, the values of the count signals 106-0 to 106-2 and 106-3M at this point are held in S latches 200-S within the memory 118-0 to 118-3 of the second memory set 118, respectively. Furthermore, a change in the counter signal 106-3M supplied to the ripple counter 118-4 is controlled to be stopped at this time.

Here, since counting during the period S2 is performed with the initial value of the count value N(Hi) at the point of the time T4A, the higher bit value held in the ripple counter 118-4 is a value after subjected to a digital CDS process. In other words, the higher bit value after a CDS process corresponding to (S2(Hi)−N2(Hi)) is held in the ripple counter 118-4.

Next, a processing method of the digital value held in each memory set will be described. As described above, the higher bits that have been subjected to a digital CDS process is already obtained. Thus, a process for the lower bits only is necessary. A differential value between the lower bit values obtained by two AD conversions performed for a reset level is denoted as diff_N, and a differential value between the lower bit values obtained by two AD conversions performed for an optical signal is denoted as diff_S. The digit operation described in the first embodiment is applied to the differential values diff_N and diff_S to obtain respective differential values that have been subjected to the digit operation are obtained. A signal after a digital CDS can be obtained by using the obtained differential values and the values held in the ripple counter to calculate the following value.

$$2\times(S2(Hi)-N2(Hi))+(\text{diff}\_S)-(\text{diff}\_N)$$

Also in the present embodiment, the same advantages as those in the first embodiment can be obtained.

Note that the bit width of the first memory set 107 is four bits and the bit width corresponding to the memories 118-0 to 118-3 in the second memory set 118 is also four bits in the above description. Further, the bit width of the ripple counter 118-4 is seven bits. Similarly to the first embodiment, however, the present embodiment is not limited to these numbers of bits. That is, these numbers of bits can be any value without departing from the spirit of the present invention. In more details, the following generalization is possible. It is assumed that, when the absolute value of a differential value between results of the first AD conversion and the second AD conversion is less than or equal to $2^N-1$ [LSB] (N is a natural number), the bit width of the first memory set 107 is N+1 bits. It is then assumed that the bit width of the plurality of memories within the second memory set 118 is also N+1 bits. It is further assumed that the bit width of the ripple counter 118-4 within the second memory set 118 is M−(N+1) bits (M is a natural number). In this case, the first memory set 107 and the plurality of memories within the second memory set 118 hold the least significant bit to the N+1th bit of the count signal set 106. The second memory set 118 holds the N+2th bit to the Mth bit of the count signal set 106.

Third Embodiment

Figure 7:
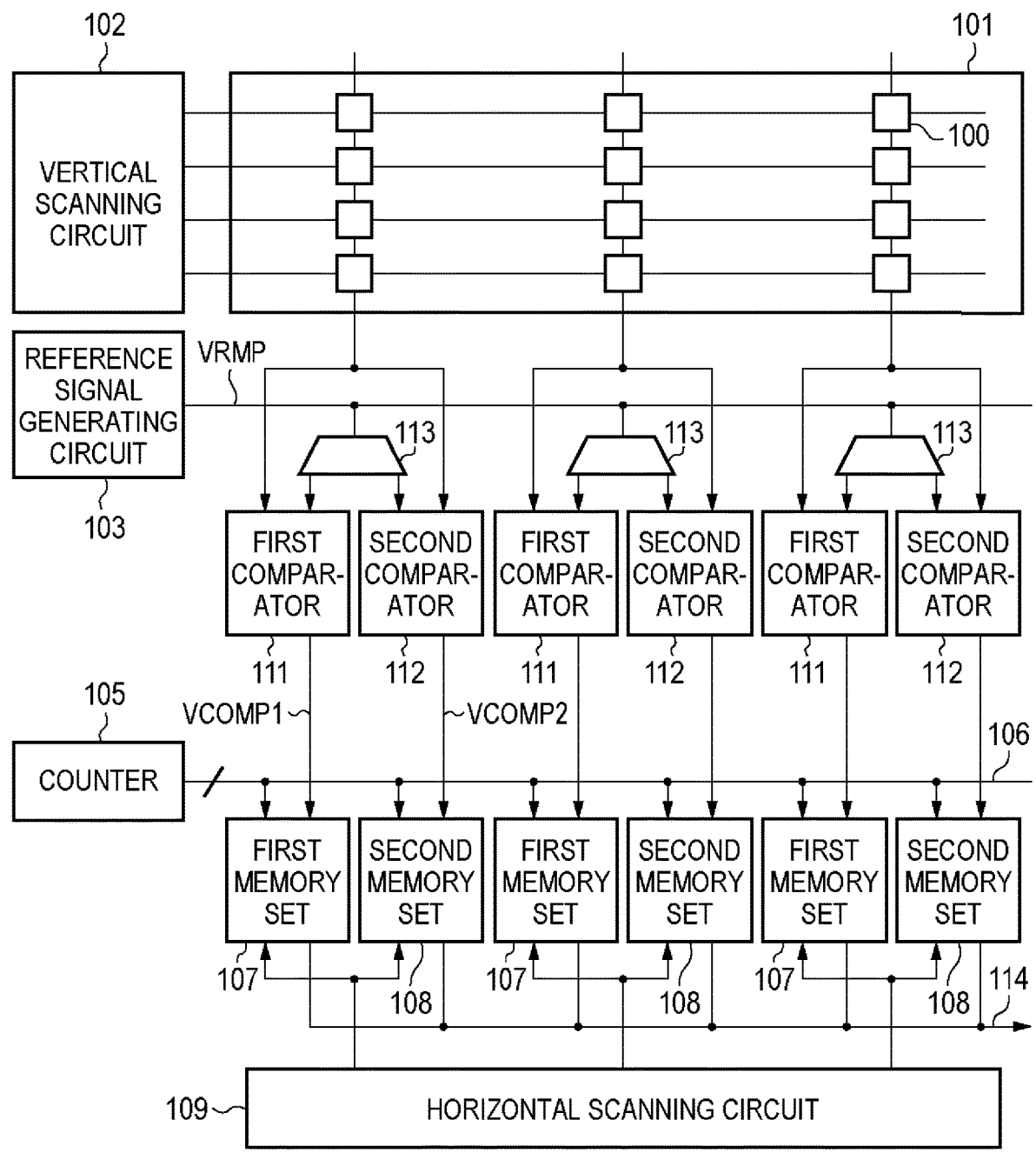
FIG. 7 is a block diagram illustrating a configuration of an imaging device according to a third embodiment.

FIG. 7 is a diagram illustrating the configuration of the imaging device according to the third embodiment. Unlike the imaging device of the first embodiment illustrated in FIG. 1A and FIG. 1B, the imaging device of the present embodiment has first comparators 111 and second comparators 112 instead of the comparators 104. Further, instead of the selection circuits 110, the imaging device of the present embodiment has selection circuits 113 in the pre-stage of the first comparators 111 and the second comparators 112. The reference signal VRMP is input to the first comparators 111 and the second comparators 112 via the selection circuits 113. Each control signal VCOMP1 output from each first comparator 111 as a comparison result is input to corresponding first memory set 107. Each control signal VCOMP2 output from each second comparators 112 as comparison result is input to corresponding second memory set 108.

Figure 8:
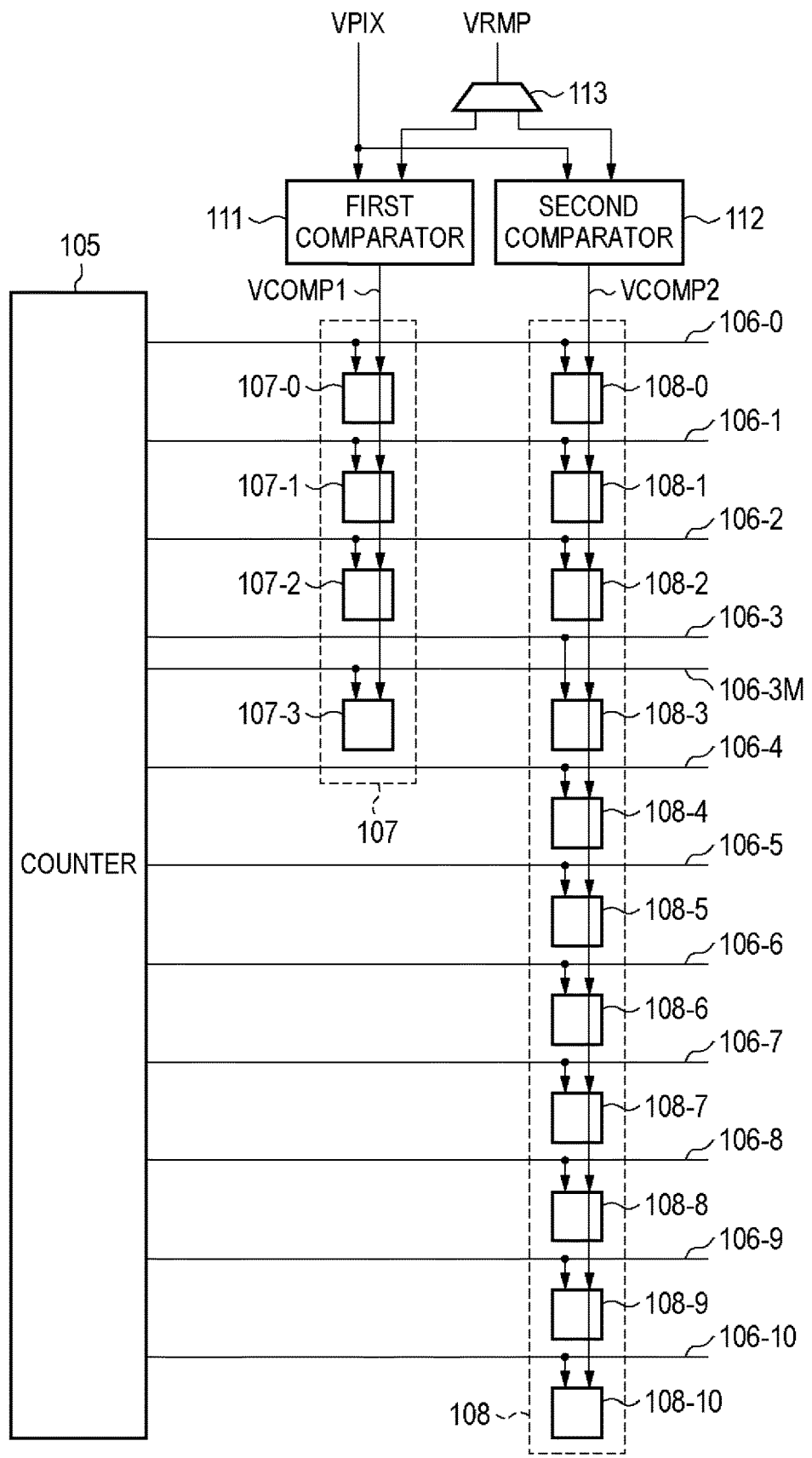
FIG. 8 is a block diagram illustrating in greater detail a configuration of a first memory set and a second memory set according to the third embodiment.

FIG. 8 is a block diagram illustrating in greater detail the configuration of the first memory set 107 and the second memory set 108 according to the third embodiment. The control signal VCOMP1 output from the first comparator 111 is input to each of the memories 107-0 to 107-3 within the first memory set 107. The control signal VCOMP2 output from the second comparator 112 is connected to each of the memories 108-0 to 108-10 within the second memory set 108. Since other configurations are the same as those in the first embodiment, description thereof will be omitted.

Next, with reference to a timing diagram of FIG. 9, operation of the present embodiment will be described in particular for features that are different from the first embodiment. Note that, since operations of the count signal set 106 are the same as those of FIG. 3B or FIG. 3C, depiction and description thereof will be omitted.

The selection circuit 113 causes the reference signal VRMP to be input to the first comparator 111 at the time of AD conversions during the period N1 and the period S1. Thereby, AD conversions are performed in the first comparator 111 and digital values are held in the first memory set 107. Further, the selection circuit 113 causes the reference signal VRMP to be input to the second comparator 112 at the time of AD conversions during the period N2 and the period S2. Thereby, AD conversions are performed in the second comparator 112 and digital values are held in the second memory set 108. Since other processes are the same as those in the first embodiment, description thereof will be omitted.

The present embodiment also allows for the same advantages as those in the first embodiment.

Note that, although two comparators and two memory sets corresponding to a column of the pixel 100 are provided in the present embodiment, the number of these elements can be changed to any number as long as the number is plural and, for example, the number may be three or more.

Fourth Embodiment

Figure 10A:
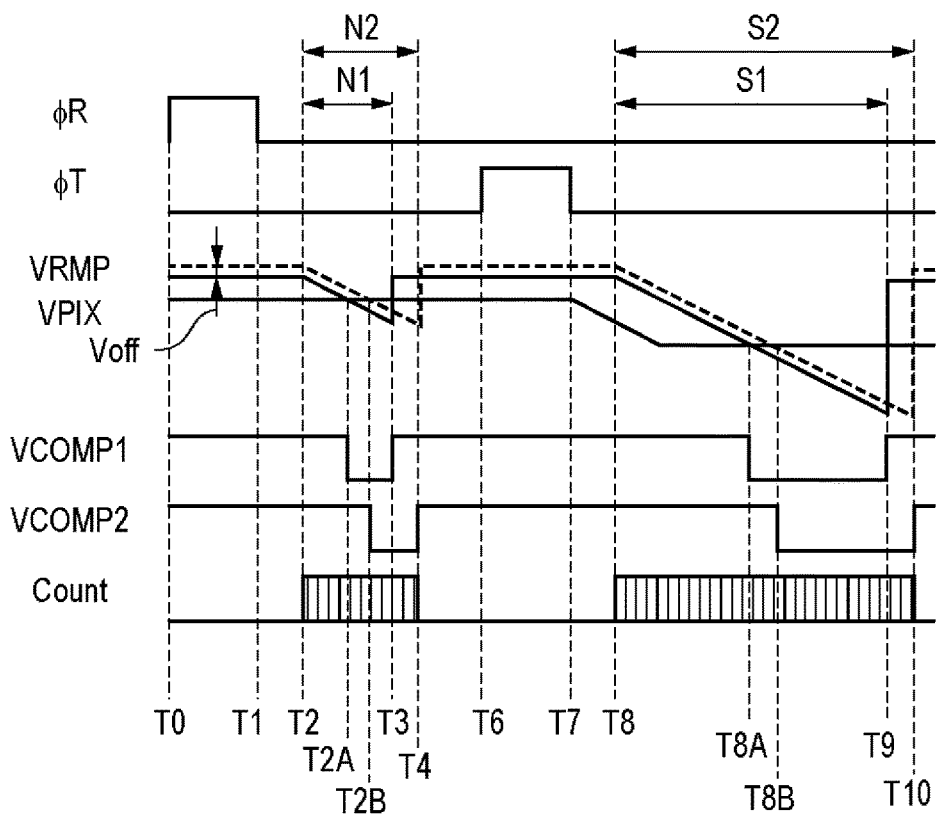
FIG. 10A is a timing diagram illustrating operation of an imaging device according to a fourth embodiment.

Next, the fourth embodiment will be described. FIG. 10A is a timing diagram illustrating operation of an imaging device according to the fourth embodiment. FIG. 103 is a timing diagram illustrating count signals. The configuration of the imaging device of the present embodiment is the same as that illustrated in FIG. 7 and FIG. 8. The present embodiment is different from the third embodiment in that an AD conversion period of the period N1 and an AD conversion period of the period N2 can be overlapped by adding a predetermined input offset voltage Voff to an input terminal of the second comparator 112 to perform AD conversions. Further, in a similar manner, an AD conversion period of the period S1 and an AD conversion period of the period S2 can also be overlapped. As an example, this addition of the input offset voltage Voff can be realized by changing the voltage of the reference signal VRMP to be input to the second comparator 112. In FIG. 10A, a dashed line represents a waveform formed by adding the input offset voltage Voff to the reference signal VRMP to be input to the second comparator 112.

Figure 9:
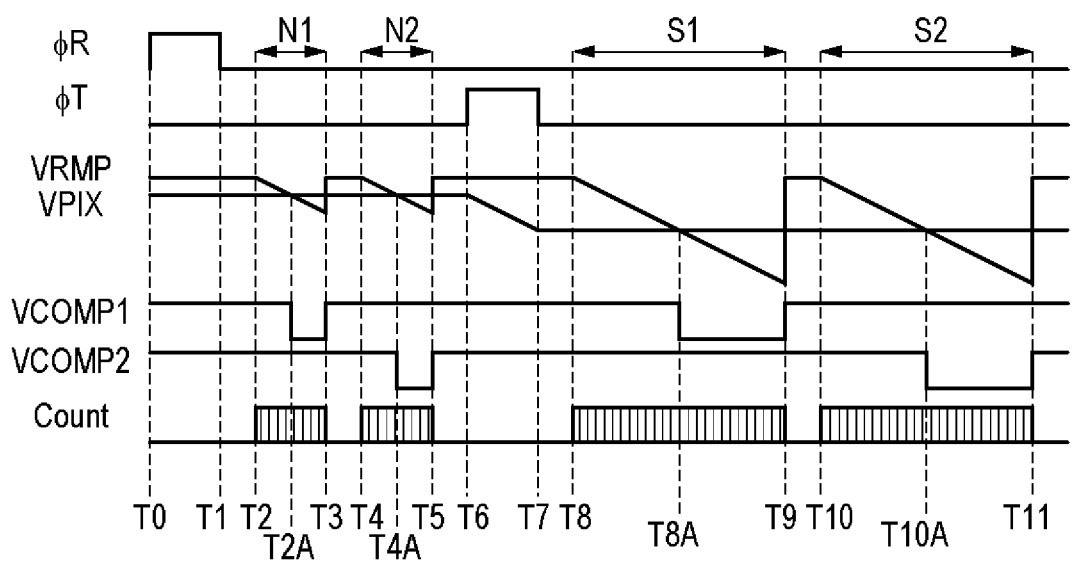
FIG. 9 is a timing diagram illustrating operation of the imaging device according to the third embodiment.

Since operation during a period before the time T2 is the same as that of FIG. 9, description thereof will be omitted. During the period N1 from the time T2 to the time T3, an AD conversion of a reset level in the first comparator 111 is performed. During the period N2 from the time T2 to the time T4, an AD conversion of a reset level in the second comparator 112 is performed. Since the input offset voltage Voff is added to the reference signal VRMP to be input to the second comparator 112, the period N2 will be longer than the period N1 in order to match the AD conversion range of the period N1 to the AD conversion range of the period N2.

During a period from the time T6 to the time T7, the control signal φT becomes a high level and the transfer transistor M2 is turned on. Thereby, charges generated at the photoelectric conversion unit PD by an incident light are transferred to the floating diffusion FD.

During the period S1 from the time TB to the time T9, an AD conversion of an optical signal in the first comparator 111 is performed. During the period S2 from the time TB to the time T10, an AD conversion of an optical signal in the second comparator 112 is performed. In a similar manner to the relationship between the period. N1 and the period N2, the period S2 will be longer than the period S1.

Figure 10B:
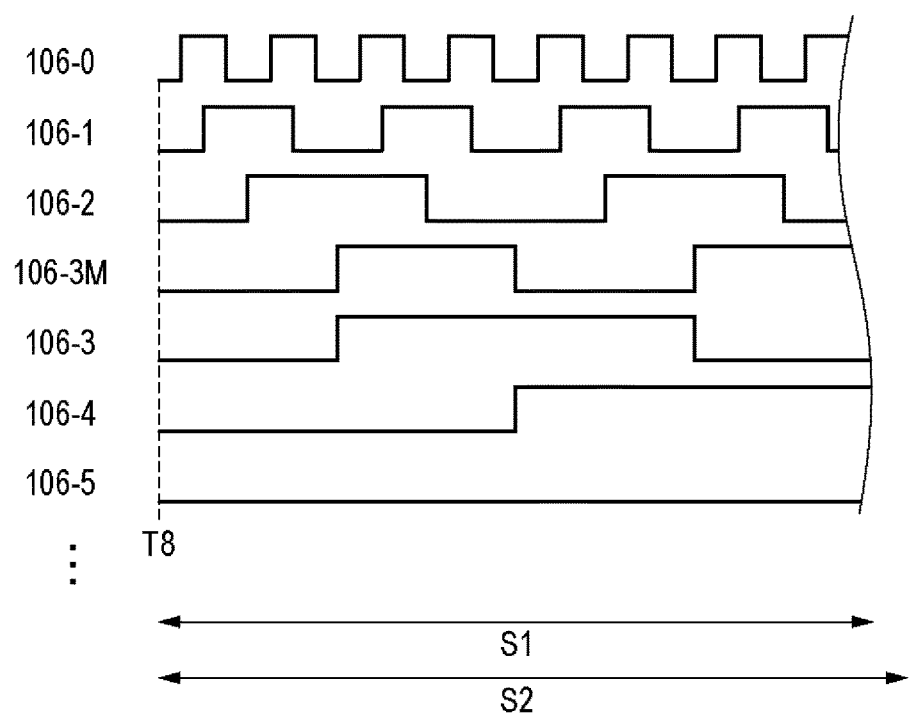
FIG. 10B is a timing diagram illustrating count signals.

An example of the AD conversion operation will be described with reference to a timing diagram of the count signal set 106 during the periods S1 and S2 illustrated in FIG. 10B. As illustrated in FIG. 10B, during the periods S1 and S2, each of the count signals 106-0 to 106-10 and 106-3M changes the value thereof and utilized in counting at the AD conversion.

At a timing T8A when the magnitude relationship of the pixel signal VPIX and the reference signal VRMP (solid line) is inverted, the polarity of the control signal VCOMP1 output from the first comparator 111 is inverted. Thereby, a digital value with a four-bit width formed of the count signals 106-0 to 106-2 and 106-3M is held in S latches 200-S of the first memory set 107. In a similar manner, at a timing T8B when the magnitude relationship of the pixel signal VPIX and the reference signal VRMP (dashed line) is inverted, the polarity of the control signal VCOMP2 output from the second comparator 112 is inverted. A digital value with an 11-bit width formed of the count signals 106-0 to 106-10 is held in S latches 200-S of the second memory set 108.

Since subsequent process on the obtained digital values is the same as the process described above except that it is required to subtract a value corresponding to the predetermined input offset voltage Voff from the conversion result held during the period S2, description of the subsequent process will be omitted.

In the first embodiment, the waveform of the reference signal VRMP used in the second AD conversion during the period N2 is identical to the waveform of the reference signal VRMP used in the first AD conversion during the period N1, and the period N1 and the period N2 are different periods from each other. In contrast, in the present embodiment, the imaging device has a plurality of comparators for each column, and the predetermined input offset voltage Voff is added to the input terminal of the second comparator 112 to perform the AD conversion. Therefore, according to the present embodiment, it is possible not only to obtain the advantages of the first embodiment, but also to overlap the period N1 with at least a part of the period N2 and also to overlap the period S1 with at least a part of the period S2.

Note that, although it has been described that a voltage corresponding to the input offset voltage Voff is added to the reference signal VRMP in the present embodiment, the input offset voltage Voff may be added to the pixel signal VPIX.

As a modified example to the third or fourth embodiment described above, the reference signal generating circuit 103 may be configured to be able to output two reference signal VRMPs and input the two reference signal VRMPs to the first comparator 111 and the second comparator 112, respectively, without passing them through the selection circuit 113. In this case, at the time of each AD conversion, the reference signal generating circuit 103 may control the waveforms of the two reference signal VRMPs separately. It is thus possible to overlap an AD conversion period of the period N1 with an AD conversion period of the period N2 and it is also possible to overlap an AD conversion period of the period S1 with an AD conversion period of the period S2. Further, the configuration of each memory set of the third or fourth embodiment may be the same configuration as that in the second embodiment illustrated in FIG. 5, and the same operation as that in the second embodiment is possible.

Fifth Embodiment

Figure 12A:
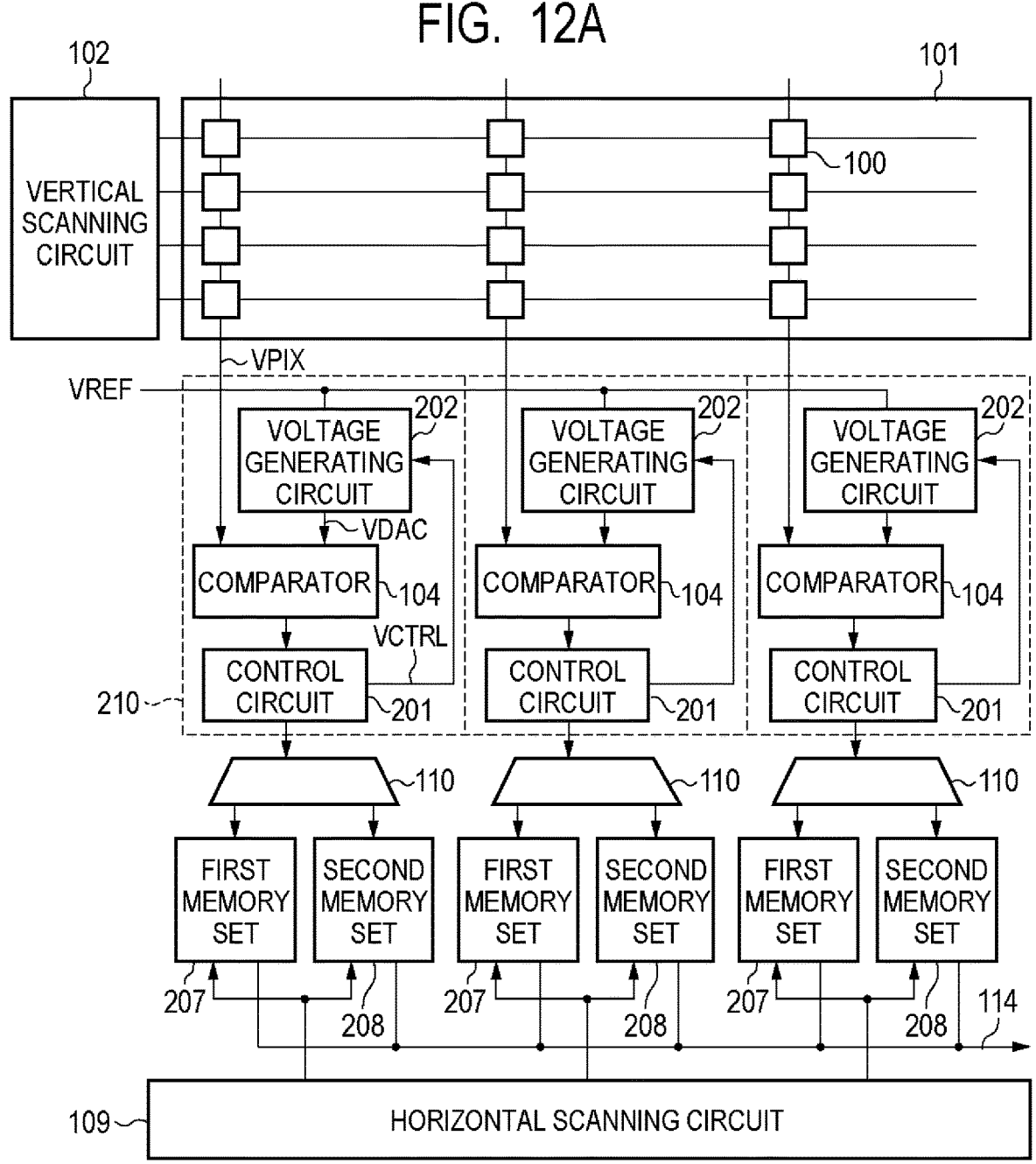
FIG. 12A is a block diagram illustrating a configuration of an imaging device according to a fifth embodiment.
Figure 12B:
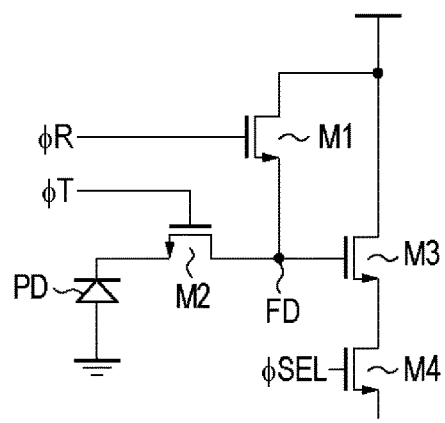
FIG. 12B is a circuit diagram illustrating a configuration of a pixel.

Next, the fifth embodiment will be described. FIG. 12A is a block diagram illustrating the configuration of an imaging device according to the fifth embodiment, and FIG. 12B is a circuit diagram illustrating the configuration of the pixel 100. Unlike the imaging device illustrated in FIG. 1A, FIG. 1B and FIG. 7, the imaging device of the present embodiment illustrated in FIG. 12A includes, on a column basis, successive approximation AD conversion circuits 210, first memory sets 207, and second memory sets 208, and each of the successive approximation AD conversion circuits 210 includes a comparator 104, a control circuit 201, and a voltage generating circuit 202. Further, neither the reference signal generating circuit 103 nor the counter 105 is provided to the imaging device of the present embodiment. Since the configuration of the pixel 100 illustrated in FIG. 123 is the same as that in FIG. 1B, description thereof will be omitted.

The pixel signal VPIX output from the pixel 100 is input to one of the input terminals of the comparator 104. The voltage generating circuit 202 outputs, to the other input terminal of the comparator 104, a voltage signal VDAC for a successive approximation operation to successively perform a binary search based on a control signal VCTRL output from the control circuit 201. Further, a reference voltage VREF is input to the voltage generating circuit 202 from a voltage source (not illustrated). The comparator 104 successively compares the pixel signal VPIX with the voltage signal VDAC to output a signal indicating an approximation result to the control circuit 201. In response to receiving a signal from the comparator 104, the control circuit 201 outputs the control signal VCTRL to the voltage generating circuit 202. Further, the control circuit 201 outputs an approximation result obtained by a successive approximation to the selection circuit 110. The selection circuit 110 selects either the first memory set 207 or the second memory set 208 as a memory set to which a digital value of an approximation result is output.

Figure 13:
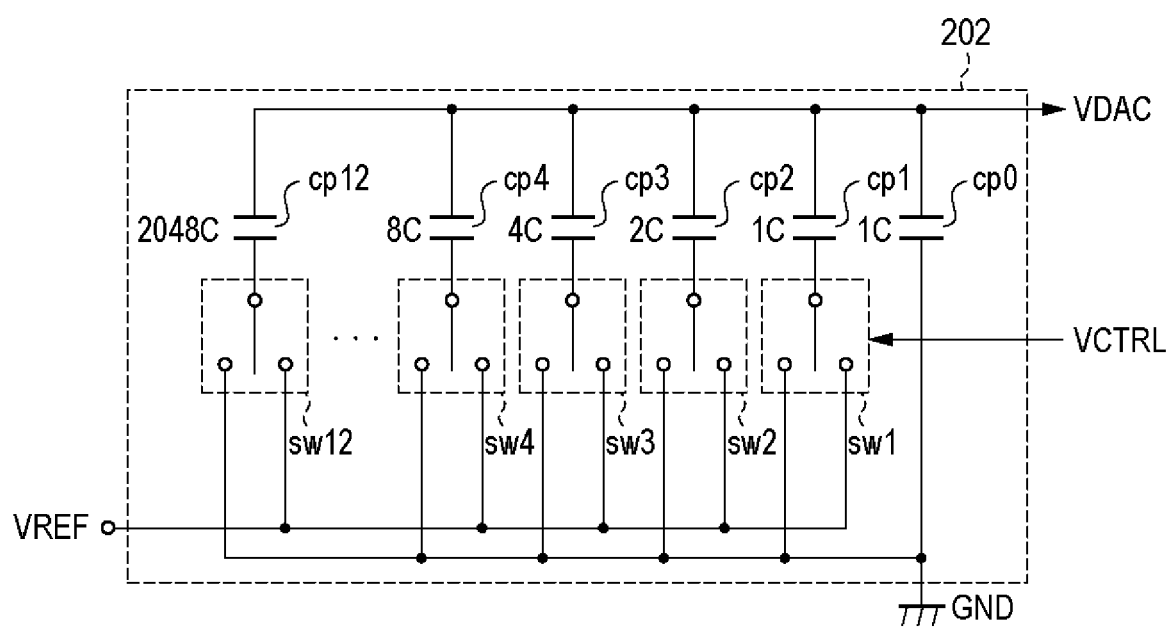
FIG. 13 is a circuit diagram illustrating a configuration of a voltage generating circuit according to the fifth embodiment.

FIG. 13 is a circuit diagram illustrating the configuration of the voltage generating circuit 202. The voltage generating circuit 202 includes a plurality of capacitors cp0 to cp12 having a binary weight capacitance and a plurality of switches sw1 to sw12 connected in series to the plurality of capacitors to cp12, respectively. The binary weight is a set of weights (capacitances) forming a geometric progression with a common ratio of two. In the example of FIG. 13, the capacitors cp0 to cp12 have capacitors of 1C, 1C, 2C, 4C, ... , 2048C in this order.

The voltage generating circuit 202 is a circuit that, in response to one or more of the plurality of switches sw1 to sw12 being switched based on the control signal VCTRL, divides the input reference voltage VREF and outputs the divided voltage as the voltage signal VDAC. One terminals of the capacitors cp0 to cp12 are connected to the output terminal of the voltage generating circuit 202. The other terminal of the capacitor cp0 is connected to the around potential GND. The other terminals of the plurality of capacitors cp1 to cp12 are connected to corresponding one terminals of the plurality of switches sw1 to sw12, respectively. Each of the other terminals of the plurality of switches sw1 to sw12 is a switchable terminal so as to be connected to either the reference voltage VREF or the ground potential GND based on the control signal VCTRL. That is, the plurality of switches sw1 to sw12 form a switch circuit that selects one or more of the capacitors cp1 to cp12 or otherwise selects none of the capacitors cp1 to cp12.

The reference voltage VREF is a constant voltage supplied from the external of the successive approximation AD conversion circuit 210 and has a voltage that is higher than the ground potential GND. In response to switching of the connection state of the plurality of switches sw1 to sw12, each of the plurality of capacitors cp1 to cp12 is supplied with the reference voltage VREF or the ground potential GND. This causes a change in the combined capacitance connected between the terminal to which the reference voltage VREF is input and the terminal from which the voltage signal VDAC is output, so that the voltage of the voltage signal VDAC changes. In other words, the voltage generating circuit 202 is a digital-to-analog conversion circuit that causes the voltage of the voltage signal VDAC to change based on the control signal VCTRL that controls the switches sw1 to sw12. Since the configuration of FIG. 13 has 12 switches sw1 to sw12, 12-bit successive approximation operation can be realized.

Figure 14:
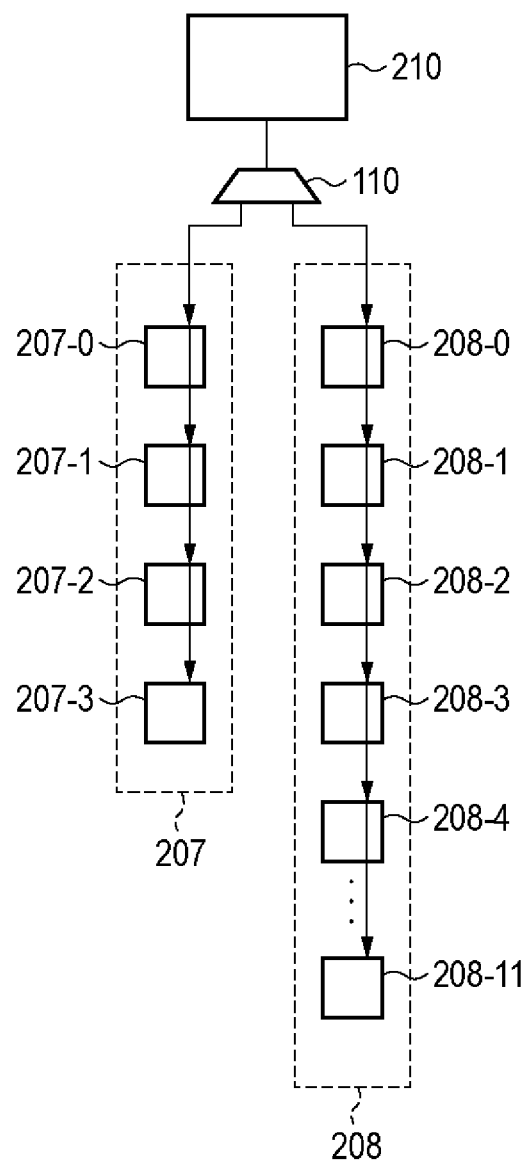
FIG. 14 is a block diagram illustrating in greater detail a configuration of a first memory set and a second memory set according to the fifth embodiment.

FIG. 14 is a diagram illustrating the configuration of a column circuit of the fifth embodiment that includes the first memory set 207 and the second memory set 208 and corresponds to one column of the pixel array 101. The first memory set 207 includes a plurality of memories 207-0 to 207-3 that hold an approximation result for four bits from the least significant bit, and the second memory set 208 includes a plurality of memories 208-0 to 208-11 that hold an approximation result for 12 bits from the least significant bit to the most significant bit. Each memory is configured to be able to hold two data in a similar manner to the memory of FIG. 2B. In a similar manner to the first embodiment or the like described above, the bit width of the first memory set 207 is defined to be a value greater than the maximum value of the differential value of multiple AD conversion results when multiple AD conversions are performed for the same signal which is a singular one of the pixel signal. The differential value in the present embodiment is mainly due to a random noise component superimposed on the pixel signal VPIX and the voltage signal VDAC, which is an output of the voltage generating circuit 202, and a random noise component generated by the comparator 104. This configuration allows for holding a plurality of bit values that may vary between results of two AD conversions.

Next, operation of the AD conversion will be described. Also in the present embodiment, two AD conversions are performed for a reset level of the pixel and two AD conversions are performed for an optical signal level, in a similar manner to other embodiments described before. Each AD conversion operation is implemented with a successive approximation operation by the successive approximation AD conversion circuit 210. In the first AD conversion results for the reset level and the optical signal level, four bits from the least significant bit to the fourth bit are held in the first memory set 207, respectively. In the second AD conversion results, all of the 12 bits from the least significant bit to the most significant bit are held in the second memory set 208, respectively.

A process for obtaining a signal corresponding to an addition of results of two AD conversions is then performed after a conversion of a held AD conversion result into a binary code when it has not been in the form of a binary code, or without such a conversion when the held AD conversion result has been in the form of a binary code. Since specific operations performed in this process are the same as those performed after a conversion into a binary code described in the first embodiment, detailed description thereof will be omitted.

As described above, the present embodiment allows for reduced noise also in the imaging device including a successive approximation AD conversion circuit by performing multiple AD conversions for a pixel signal output from the same pixel and adding the obtained AD conversion results.

According to the first to fifth embodiments, the number of elements can be reduced in an imaging device that includes an AD conversion circuit on each column of a plurality of pixels and performs multiple AD conversions for the input pixel signal.

Sixth Embodiment

Figure 11:
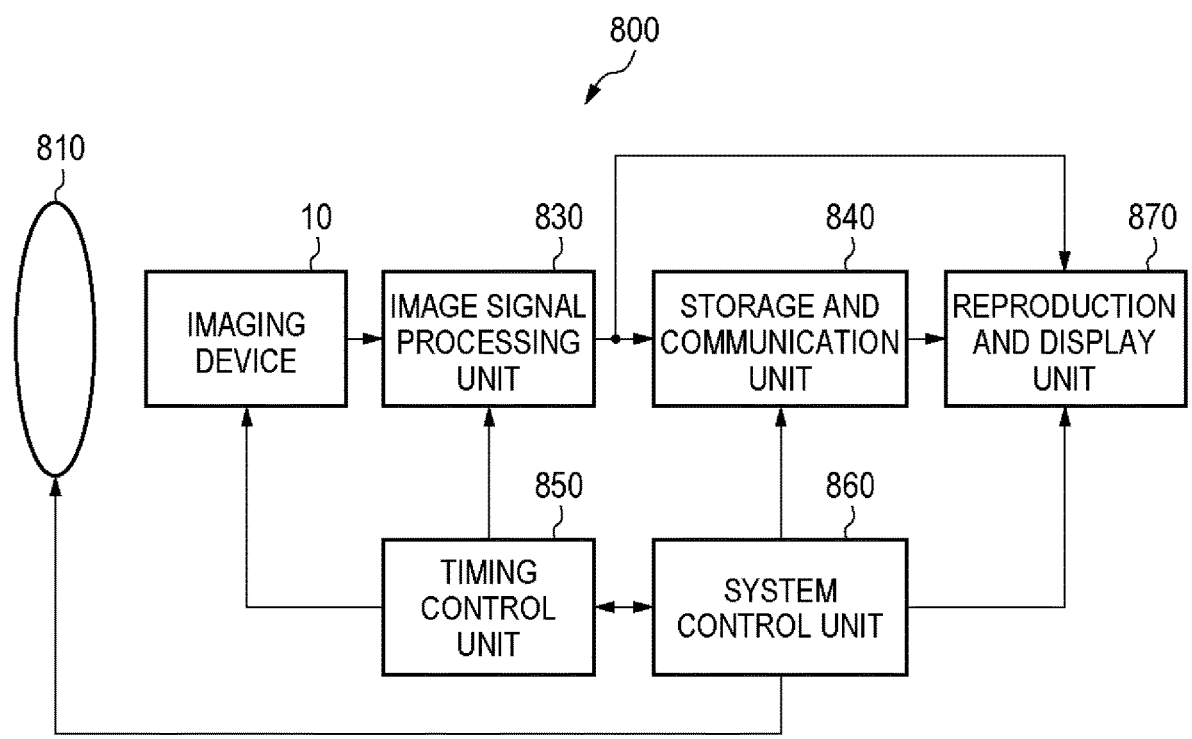
FIG. 11 is a block diagram illustrating a configuration of an imaging system of a sixth embodiment.

FIG. 11 illustrates a configuration of an imaging system 800 according to the sixth embodiment. The imaging system 800 may include, for example, a digital still camera, a digital camcorder, a surveillance camera, or the like. The imaging system 800 includes an optical unit 810, an imaging device 10, an image signal processing unit 830, storage and communication unit 840, a timing control unit 850, a system control unit 860, and a reproduction and display unit 870. The imaging device of any of the first to fifth embodiments described above is used for the imaging device 10.

The optical unit 810 that is an optical system such as lens causes a light from a subject to be captured on the pixel array 101 of the imaging device 10 and forms an image of the subject in which a plurality of pixels 100 are arranged in a matrix. The imaging device 10 outputs a signal in accordance with a light captured on the pixel array 101 at a timing that is based on a signal from the timing control unit 850. A signal output from the imaging device 10 is input to the image signal processing unit 830, and the image signal processing unit 830 performs signal processing according to a method defined by a program or the like. Note that a signal processing performed by the image signal processing unit 830 may include a digital CDS, a digit operation, and the like described in the first embodiment or the like. A signal obtained by a process at the image signal processing unit 830 is transmitted to the storage and communication unit 840 as image data. The storage and communication unit 840 transmits a signal for forming an image to the reproduction and display unit 870 to cause the reproduction and display unit 870 to reproduce and display a moving image or a still image. Alternatively, an output signal from the image signal processing unit 830 may be directly transmitted to the reproduction and display unit 870 to reproduce and display a moving image or a still image. Further, the storage and communication unit 840 communicates with the system control unit 860 in response to a signal from the image signal processing unit 830 and also operates to store signals for forming an image in a storage medium (not illustrated).

The system control unit 860 is for generally controlling the operation of the imaging system to control driving of the optical unit 810, the timing control unit 850, the storage and communication unit 840, and the reproduction and display unit 870. Further, the system control unit 860 has a storage device (not illustrated) that is a storage medium, for example. A program or the like necessary for controlling the operation of the imaging system is stored in this storage device. Further, the system control unit 860 supplies, to the inside of the imaging system, a signal for switching drive modes in response to a user operation, for example. A specific example thereof may be a change of a row to be read out, a change of a row to be reset, a change of an angle of view involved in electronic zooming, a shift of an angle of view involved in electronic vibration isolation, or the like. The timing control unit 850 controls drive timings of the imaging device 10 and the image signal processing unit 830 based on control by the system control unit 860.

As described above, the imaging system 800 of the present embodiment is able to perform a capturing operation by employing the imaging device 10 of any of the first to fifth embodiments described above.

Embodiments to which the present invention can be applied are not limited to the embodiments described above. For example, it is to be understood that the embodiments to which the present invention can be applied may be configured by adding a part of the configuration of one embodiment to another embodiment or replacing a part of the configuration of one embodiment with a part of the configuration of another embodiment.

Further, the imaging system described in the sixth embodiment is a mere example of an imaging system to which the imaging devices of the present invention can be applied, and the imaging system to which the imaging device of the present invention can be applied is not limited to the configuration illustrated in FIG. 11.

Other Embodiments

Embodiments of the present invention can also be realized by a computer of a system or apparatus that reads out and executes computer executable instructions (e.g., one or more programs) recorded on a storage medium (which may also be referred to more fully as a "non-transitory computer-readable storage medium") to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk. (such as a compact disc (CD), digital versatile disc (DVD), or Btu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-178255, filed Sep. 10, 2015, and Japanese Patent Application No. 2016-083424, filed Apr. 19, 2016, which are hereby incorporated by reference herein in their entirety.

What is claimed is:

1. An imaging device comprising:
a plurality of pixels arranged to form a plurality of columns and each configured to output a pixel signal by a photoelectric conversion in accordance with an incident light;
a plurality of analog-to-digital (AD) conversion circuits provided correspondingly to the plurality of columns and each configured to perform analog-to-digital conversions for the pixel signal, each of the AD conversion circuits being configured to performs multiple AD conversions including a first AD conversion and a second AD conversion for a singular one of the pixel signal; and
a signal processing circuit configured to add and/or average a first digital value obtained by the first AD conversion and a second digital value obtained by the second AD conversion,
wherein the signal processing circuit is configured to use the least significant bit to an N+1th bit of the first digital value and the least significant bit to an Mth bit of the second digital value, where N is a natural number and M is a natural number greater than N+1, while at least an Mth bit of the first digital value is not used in adding and averaging.

2. The imaging device according to claim 1, wherein each of the AD conversion circuits includes a successive approximation AD conversion circuit that performs the first AD conversion and the second AD conversion by comparing the pixel signal with a voltage signal for a successive approximation operation to successively perform a binary search.

3. The imaging device according to claim 1, wherein the signal processing circuit is configured to:

obtain a differential value resulted by subtracting, from the first digital value, a value of the least significant bit to an N+1th bit of the second digital value, and output a value obtained by adding a twofold value of the second digital value and the differential value.

4. The imaging device according to claim 1, wherein the signal processing circuit is configured to:

obtain a differential value resulted by subtracting, from the first digital value, a value of the least significant bit to an N+1th bit of the second digital value, output a value obtained by adding a twofold value of the second digital value and the differential value when the differential value is within a range from −(2N−1) [LSB] to 2N−1 [LSB], the range including −(2N−1) [LSB] and 2N−1 [LSB], output a value obtained by adding the twofold value of the second digital value and the differential value and subtracting 2N+1 from a result of the addition when the differential value is greater than 2N−1 [LSB], and output a value obtained by adding the twofold value of the second digital value and the differential value and adding 2N+1 to a result of the addition when the differential value is less than −(2N−1) [LSB].

5. An imaging system comprising:

the imaging device according to claim 1; and a signal processing unit configured to process a signal output from the imaging device.

6. A signal processing device comprising:

a plurality of analog-to-digital (AD) conversion circuits each configured to perform analog-to-digital conversions for an analog signal generated by a photoelectric conversion in accordance with an incident light, each of the AD conversion circuits being configured to perform multiple AD conversions including a first AD conversion and a second AD conversion for a singular one of the analog signal; and a signal processing circuit configured to add or average a first digital value obtained by the first AD conversion and a second digital value obtained by the second AD conversion, wherein the signal processing circuit is configured to use the least significant bit to an N+1th bit of the first digital value and the least significant bit to an Mth bit of the second digital value, where N is a natural number and M is a natural number greater than N+1, while at least an Mth bit of the first digital value is not used.

7. The signal processing device according to claim 6, wherein each of the AD conversion circuits includes a successive approximation AD conversion circuit that performs the first AD conversion and the second AD conversion by comparing the pixel signal with a voltage signal for a successive approximation operation to successively perform a binary search.

8. The signal processing device according to claim 6, wherein the signal processing circuit configured to:

obtain a differential value resulted by subtracting, from the first digital value, a value of the least significant bit to an N+1th bit of the second digital value, and output a value obtained by adding a twofold value of the second digital value and the differential value.

9. The imaging device according to claim 6, wherein the signal processing circuit is configured to:

obtain a differential value resulted by subtracting, from the first digital value, a value of the least significant bit to an N+1th bit of the second digital value, output a value obtained by adding a twofold value of the second digital value and the differential value when the differential value is within a range from −(2N−1) [LSB] to 2N−1 [LSB], the range including −(2N−1) [LSB] and 2N−1 [LSB], output a value obtained by adding the twofold value of the second digital value and the differential value and subtracting 2N+1 from a result of the addition when the differential value is greater than 2N−1 [LSB], and output a value obtained by adding the twofold value of the second digital value to the differential value and adding 2N+1 to a result of the addition when the differential value is less than −(2N−1) [LSB].

10. An imaging device comprising:

a plurality of pixels arranged to form a plurality of columns and each configured to output a pixel signal by a photoelectric conversion in accordance with an incident light;

a plurality of comparators provided correspondingly to the plurality of columns and each configured to determine a magnitude relationship in comparison between the pixel signal and a reference signal changing with time and output a control signal in response to an inversion of the magnitude relationship;

a counter configured to output a count value indicating elapsed time after the reference signal starts changing; and a signal processing circuit, wherein each of the comparators performs multiple comparisons including a first comparison and a second comparison for a singular one of the pixel signal, wherein the signal processing circuit is configured to add and/or average a first count value obtained by the first comparison and a second count value obtained by the second comparison, and wherein the signal processing circuit is configured to use the least significant bit to an N+1th bit of the first count value and the least significant bit to an Mth bit of the second count value, where N is a natural number and M is a natural number greater than N+1, while at least an Mth bit of the first count value is not used in adding and averaging.

11. The imaging device according to claim 10, wherein the count value is a Gray code including a plurality of bits.

12. The imaging device according to claim 10, wherein the counter outputs the count value common to the plurality of the comparators.

13. The imaging device according to claim 10, wherein the comparators are provided to the plurality of columns in one-to-one correspondence.

14. The imaging device according to claim 10, wherein at least two of the comparators are provided to each of the plurality of columns.

15. The imaging device according to claim 14, wherein the at least two of the comparators corresponding to a same column of the plurality of columns have input offset voltages that are different from each other.

16. The imaging device according to claim 10, wherein the count value output by the counter in the first comparison is a Gray code with N+1 bits, and wherein the count value output by the counter in the second comparison is a Gray code with M bits.

17. The imaging device according to claim 10, further comprising:

first memories provided correspondingly to the plurality of columns and each configured to hold the count value at a point of time when the control signal is output and second memories provided correspondingly to the plurality of columns and each configured to hold the count value at a point of time when the control signal is output,
wherein each of the second memories includes:
a memory that has a bit width of N+1 bits and holds the least significant bit to an N+1th bit of the count value obtained by the second comparison, and
a ripple counter that has a bit width of M−(N+1) bits and holds an N+2th bit to an Mth bit of a count value corresponding to a difference between the count value obtained by the second comparison and the count value obtained by the first comparison.

18. The imaging device according to claim 10, wherein the each of the comparators uses a same reference signal in the first comparison and the second comparison, and wherein the first comparison and the second comparison are performed during periods that are different from each other.

19. The imaging device according to claim 10, wherein each of the comparators:
determines a magnitude relationship in a comparison between the pixel signal and a first reference signal in the first comparison, and
determines a magnitude relationship in a comparison between the pixel signal and a second reference signal that is different from the first reference signal in the second comparison.

20. The imaging device according to claim 10, wherein the signal processing circuit is configured to:
obtain a differential value resulted by subtracting, from the first count value, a value of the least significant bit to an N+1th bit of the second count value, and
output a value obtained by adding a twofold value of the second count value and the differential value.

21. The imaging device according to claim 10, wherein the signal processing circuit is configured to:
obtain a differential value resulted by subtracting, from the first count value, a value of the least significant bit to an N+1th bit of the second count value,
output a value obtained by adding a twofold value of the second count value and the differential value when the differential value is within a range from −(2N−1) [LSB] to 2N−1 [LSB], the range including −(2N−1) [LSB] and 2N−1 [LSB],
output a value obtained by adding the twofold value of the second count value and the differential value and subtracting 2N+1 from a result of the addition when the differential value is greater than 2N−1 [LSB], and
output a value obtained by adding the twofold value of the second count value and the differential value and adding 2N+1 to a result of the addition when the differential value is less than −(2N−1) [LSB].

22. An imaging system comprising:
the imaging device according to claim 10; and
a signal processing unit configured to process a signal output from the imaging device.

23. A signal processing device comprising:
a plurality of comparators each configured to determine a magnitude relationship in comparison between an analog signal generated by a photoelectric conversion in accordance with an incident light and a reference signal changing with time and to output a control signal in response to an inversion of the magnitude relationship;
a counter configured to output a count value indicating elapsed time after the reference signal starts changing; and
a signal processing circuit,
wherein each of the comparators performs multiple comparisons including a first comparison and a second comparison for a singular one of the analog signal,
wherein the signal processing circuit is configured to add and/or average a first count value obtained by the first comparison and a second count value obtained by the second comparison, and
wherein the signal processing circuit is configured to use the least significant bit to an N+1th bit of the first count value and the least significant bit to an Mth bit of the second count value, where N is a natural number and M is a natural number greater than N+1, while at least an Mth bit of the first count value is not used in adding and averaging.

24. The signal processing device according to claim 23, wherein the signal processing circuit is configured to:
obtain a differential value resulted by subtracting, from the first count value, a value of the least significant bit to an N+1th bit of the second count value, and
output a value obtained by adding a twofold value of the second count value and the differential value.

25. The signal processing device according to claim 23, wherein the signal processing circuit is configured to:
obtain a differential value resulted by subtracting, from the first count value, a value of the least significant bit to an N+1th bit of the second count value,
output a value obtained by adding a twofold value of the second count value and the differential value when the differential value is within a range from −(2N−1) [LSB] to 2N−1 [LSB], the range including −(2N−1) [LSB] and 2N−1 [LSB],
output a value obtained by adding the twofold value of the second count value and the differential value and subtracting 2N+1 from a result of the addition when the differential value is greater than 2N−1 [LSB], and
output a value obtained by adding the twofold value of the second count value and the differential value and adding 2N+1 to a result of the addition when the differential value is less than −(2N−1) [LSB].

26. A method of signal processing comprising:
determining a magnitude relationship in comparison between an analog signal generated by a photoelectric conversion in accordance with an incident light and a reference signal changing with time, the determining including a first comparison and a second comparison for a singular one of the analog signal;
outputting a control signal in response to an inversion of the magnitude relationship;
outputting a count value indicating elapsed time after the reference signal starts changing; and
adding and/or averaging a first count value obtained by the first comparison and a second count value obtained by the second comparison,
wherein the adding and/or averaging uses the least significant bit to an N+1th bit of the first count value and the least significant bit to an Mth bit of the second count value, where N is a natural number and M is a natural number greater than N+1, while at least an Mth bit of the first count value is not used in the adding and/or averaging.

* * * * *